(12) United States Patent
Takahara

(10) Patent No.: US 6,390,539 B2
(45) Date of Patent: May 21, 2002

(54) AUTOMOTIVE IMPACT ENERGY ABSORBING STRUCTURE

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/848,204

(22) Filed: May 4, 2001

Related U.S. Application Data

(62) Division of application No. 09/069,734, filed on Apr. 30, 1998.

(30) Foreign Application Priority Data

Jun. 18, 1997 (JP) .............................................. 9-176590
Jun. 18, 1997 (JP) .............................................. 9-176594
Jun. 19, 1997 (JP) .............................................. 9-177775

(51) Int. Cl.$^7$ .............................................. B60R 21/02
(52) U.S. Cl. ........................ 296/189; 296/39.1; 280/748
(58) Field of Search ................................ 296/39.1, 189; 280/748, 751

(56) References Cited

U.S. PATENT DOCUMENTS

| | | | |
|---|---|---|---|
| 3,724,153 A | | 4/1973 | Wessells, III et al. |
| 3,779,595 A | | 12/1973 | Suzuki et al. |
| 5,046,777 A | | 9/1991 | Gamweider et al. |
| 5,163,730 A | * | 11/1992 | Welch .......................... 296/189 |
| 5,382,051 A | | 1/1995 | Glance |
| 5,564,744 A | * | 10/1996 | Frost ........................... 280/751 |
| 5,575,500 A | | 11/1996 | Mimura et al. |
| 5,641,195 A | * | 6/1997 | Patel et al. ............... 280/751 X |
| 5,660,426 A | * | 8/1997 | Sugimori et al. ....... 296/39.1 X |
| 5,680,886 A | | 10/1997 | Ohtsuka |
| 5,720,510 A | * | 2/1998 | Daniel et al. ........... 296/189 X |
| 5,722,715 A | * | 3/1998 | Patel et al. .................. 296/189 |
| 5,741,044 A | | 4/1998 | Kawai et al. |
| 5,762,392 A | | 6/1998 | Suga |
| 5,791,716 A | | 8/1998 | Takagi et al. |
| 5,857,734 A | | 1/1999 | Okamura et al. |
| 5,992,924 A | | 11/1999 | Noritake et al. |
| 6,036,251 A | | 3/2000 | Yagishita et al. |
| 6,042,176 A | | 3/2000 | Ikeda et al. |

FOREIGN PATENT DOCUMENTS

| | | |
|---|---|---|
| JP | U-4-119756 | 10/1992 |
| JP | 7-61304 | 3/1995 |
| JP | A-7-277117 | 10/1995 |
| JP | A-8-119047 | 5/1996 |
| JP | A-8-127298 | 5/1996 |
| JP | A-8-230579 | 9/1996 |
| JP | A-9-95197 | 4/1997 |
| JP | A-9-240400 | 9/1997 |

* cited by examiner

Primary Examiner—Dennis H. Pedder
(74) Attorney, Agent, or Firm—Oliff & Berridge PLC

(57) ABSTRACT

An automotive impact energy absorbing structure has a structural member having an inner panel, and an interior member spaced from the inner panel by an interval extending therefrom toward the inside of a compartment. A hollow body is disposed within the interval. Impact energy applied to the hollow body from inside the compartment is absorbed by deformation of the hollow body.

6 Claims, 21 Drawing Sheets

AUTOMOTIVE IMPACT ENERGY ABSORBING STRUCTURE

This application is a divisional of Ser. No. 09/069,734, filed Apr. 30, 1998.

INCORPORATION BY REFERENCE

The disclosures of Japanese Patent Application Nos. Hei 9-176594 filed on Jun. 18, 1997, Hei 9-176590 filed on Jun. 18, 1997, and Hei 9-177775 filed on Jun. 19, 1997, each including the specification, drawings and abstract, are incorporated herein by reference in their entirety.

BACKGROUND OF THE INVENTION

1. Field of Invention

The present invention relates to an automotive impact energy absorbing structure and, more particularly, to an impact energy absorbing structure for absorbing impact energy applied to an upper portion of a body of a motor vehicle from inside a compartment, using an energy absorbing member that deforms to absorb the impact energy applied thereto.

2. Description of Related Art

Japanese patent application laid-open Nos. Hei 8-119047 and Hei 8-127298 propose automotive energy absorbing structures for absorbing impact energy using a resin-made energy absorbing body (for example, a grating-like rib) that is disposed in a space between a pillar having an inner panel and a pillar garnish disposed at a passenger compartment interior side and separated from the inner panel by the space.

If the energy absorbing body is formed as a resin-made grating-like rib member, the amount of energy absorbed by the member during an initial period of application of impact energy is relatively small since plastic deformation of the resin-made grating-like rib member starts late relative to the amount of deformation. Furthermore, the resin-made grating-like rib member is subject to changes in load bearing strength due to temperature or humidity changes and, in some environments, tends to deteriorate over time, thus resulting in a decreased capacity for energy absorption. Therefore, in designing energy absorbing resin-made grating-like rib members, the dimensions thereof are determined so that the members remain able to absorb desired amounts of energy even when they deteriorate. Thus, the energy-absorbing members inevitably become large in size.

SUMMARY OF THE INVENTION

Accordingly, it is an object of the present invention to provide an automotive impact energy absorbing structure in which the time until the start of plastic deformation relative to the amount of deformation during an initial period of application of impact energy is shortened while retaining an intended energy absorption capacity, and which allows a size reduction of an energy absorbing member.

It is another object of the invention to provide an automotive impact energy absorbing structure that allows adjustment of an energy absorbing characteristic.

It is still another object of the invention to provide an automotive impact energy absorbing structure that allows the deforming direction of the energy absorbing structure to be forcibly determined by an interior member disposed at a compartment interior side of the energy absorbing member.

According to a first aspect of the invention, there is provided an automotive impact energy absorbing structure including a structural member provided in an upper part of a vehicular body. The structure member has an inner panel. An interior member is spaced from the inner panel by an interval extending therefrom toward the inside of a compartment. A hollow body made from metal is disposed in the interval.

According to a second aspect of the invention, there is provided an automotive impact energy absorbing structure including a structural member extending in an upper portion of a vehicle body, in a lengthwise direction, and an interior member spaced from the structure member by an interval extending therefrom toward an inside of a compartment. A hollow body made from metal is disposed in the interval. The hollow body is adhered to the interior member so that an axis of the hollow body extends in a lengthwise direction relative to the structural member.

According to a third aspect of the invention, there is provided an automotive impact energy absorbing structure including a structural member extending in an upper portion of a vehicle body in a front-and-rear direction relative to the vehicle body. The structural member includes a panel. An interior member is spaced from the panel by an interval extending therefrom toward an inside of a compartment. The interior member is formed so that the thickness of the interior member in a section taken on a plane perpendicular to an axis extending in a lengthwise direction relative to the structural member varies locally. A hollow body made from metal is disposed in the interval and fixed to the interior member.

According to the first aspect of the invention, if a load equal to or greater than a predetermined value is applied to the hollow body, the hollow body deforms, thereby absorbing impact energy.

According to the first aspect of the invention, the hollow body has a greater ductility than a grating rib, and starts to plastically deform at an earlier timing relative to an amount of displacement. Therefore, the hollow body can sufficiently absorb impact energy during an initial period of load application. Furthermore, the hollow body may have a closed configuration in a section taken on a plane perpendicular to the axis of the hollow body. Then, it becomes easier to adjust the size of the area that receives load or the size of the area that transmits load imposed on the hollow body to the inner panel.

The hollow body may also be formed by extrusion forming, and can easily be formed into a desired configuration or desired dimensions. Therefore, it becomes possible to reduce changes in the energy absorbing characteristics depending on the direction of load application by forming an entire configuration of the hollow body that is optimal in accordance with the interval between the structure member and the inner panel, by locally changing the thickness of the hollow body, or by forming a rib standing in the hollow of the hollow body.

Since the hollow body is not substantially affected by atmosphere temperature or humidity, there is only a small change in load bearing strength due to temperature or humidity and substantially no deterioration over time due to the environment. If the hollow body is formed from aluminum by extrusion forming, it is possible to re-process or reshape a hollow body deformed for absorption of impact energy, for reuse, since aluminum is suitable for recycling or reuse.

According to the second aspect of the invention, the interior member and the hollow body have different ductilities. Therefore, if a load equal to or greater than a predetermined value is transmitted to the hollow body by the interior member, a relative displacement occurs at adhering portions between the two members so that the sheering force based on the relative displacement acts on the adhesive. The reaction force to the sheering force at the adhering portions between the interior member and the hollow body also absorbs impact energy, thereby achieving energy absorbing characteristics different from the original energy absorbing characteristics of the hollow body. Furthermore, a change in the adhering manner can also change the energy absorbing characteristics.

Since the hollow body can be formed into any desired sectional shape, the hollow body can easily be adapted to the interval between the structure member and the interior member. Furthermore, because it is possible to select a location of adhesion to the interior member and an adhesion area from a wide range of choices, and because it is possible to achieve various characteristics by selecting a wall thickness or a sectional shape of the hollow body, the degree of freedom in selecting energy absorbing characteristics is high.

The interior member may be attached to the structural member as follows. First, an adhesive is applied to required portions of the interior member, and then the hollow body is adhered to the interior member by the adhesive. Alternatively, after the hollow body is placed on a required location on the interior member, an adhesive is applied to adhere the hollow body to the interior member. After that, the interior member, together with the hollow body, can easily be attached to the structural member.

According to the third aspect of the invention, if a load equal to or greater than a predetermined value is applied so that the interior member deforms, the hollow body fixed to the interior member is displaced together with the interior member in the direction of the load. When the hollow body contacts the panel of the structure member, the hollow body starts to plastically deform, absorbing impact energy.

According to the third aspect of the invention, the thickness of the interior member locally varies. If a load is applied to a portion of the interior member that is remote from the thinnest portion of the interior member, the interior member deforms with the thinnest portion acting like a fulcrum. As the interior member thus deforms, the hollow body is displaced toward the panel of the structure member. Therefore, it is possible to forcibly restrict a portion of the hollow body that deforms, by using the interior member. If a load is applied to the thinnest portion of the interior member, the entire interior member is displaced in the direction of the load, thereby deforming the hollow body. Therefore, it is easy to provide an energy absorbing body with an amount of displacement, a shape and the like which are required for energy absorption. Thereby, a sufficient amount of energy absorption can be secured. Furthermore, since there is no need to provide a hollow body with deforming characteristics in accordance with various load directions in order to secure a required amount of energy absorption, the configuration and structure of the energy absorbing body can be simplified.

BRIEF DESCRIPTION OF THE DRAWINGS

The foregoing and further objects, features and advantages of the present invention will be described in or apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 2:
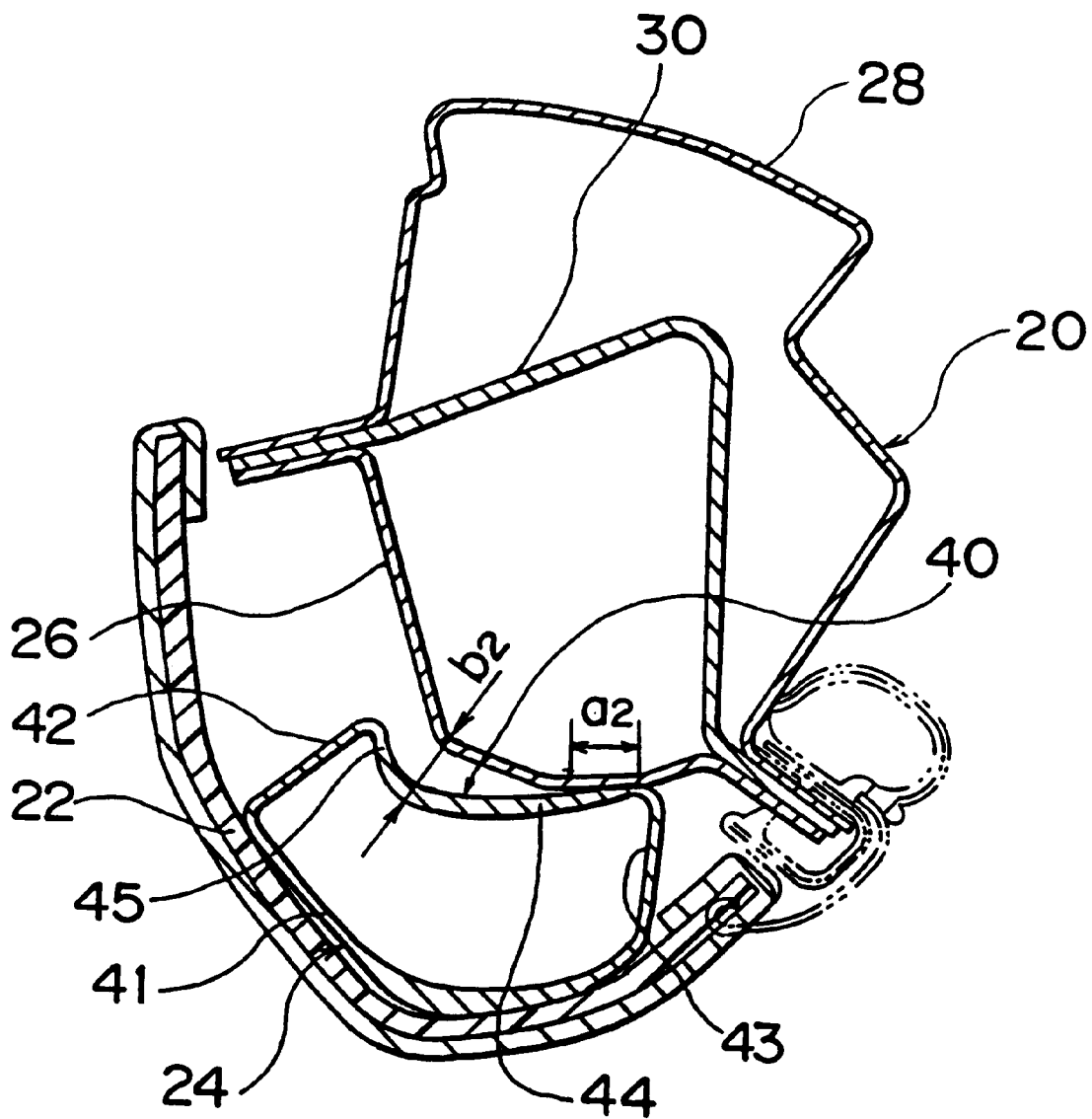
FIG. 2 is a sectional view of the first preferred embodiment of the automotive impact energy absorbing structure taken on line 2-2 of FIG. 3.
Figure 3:
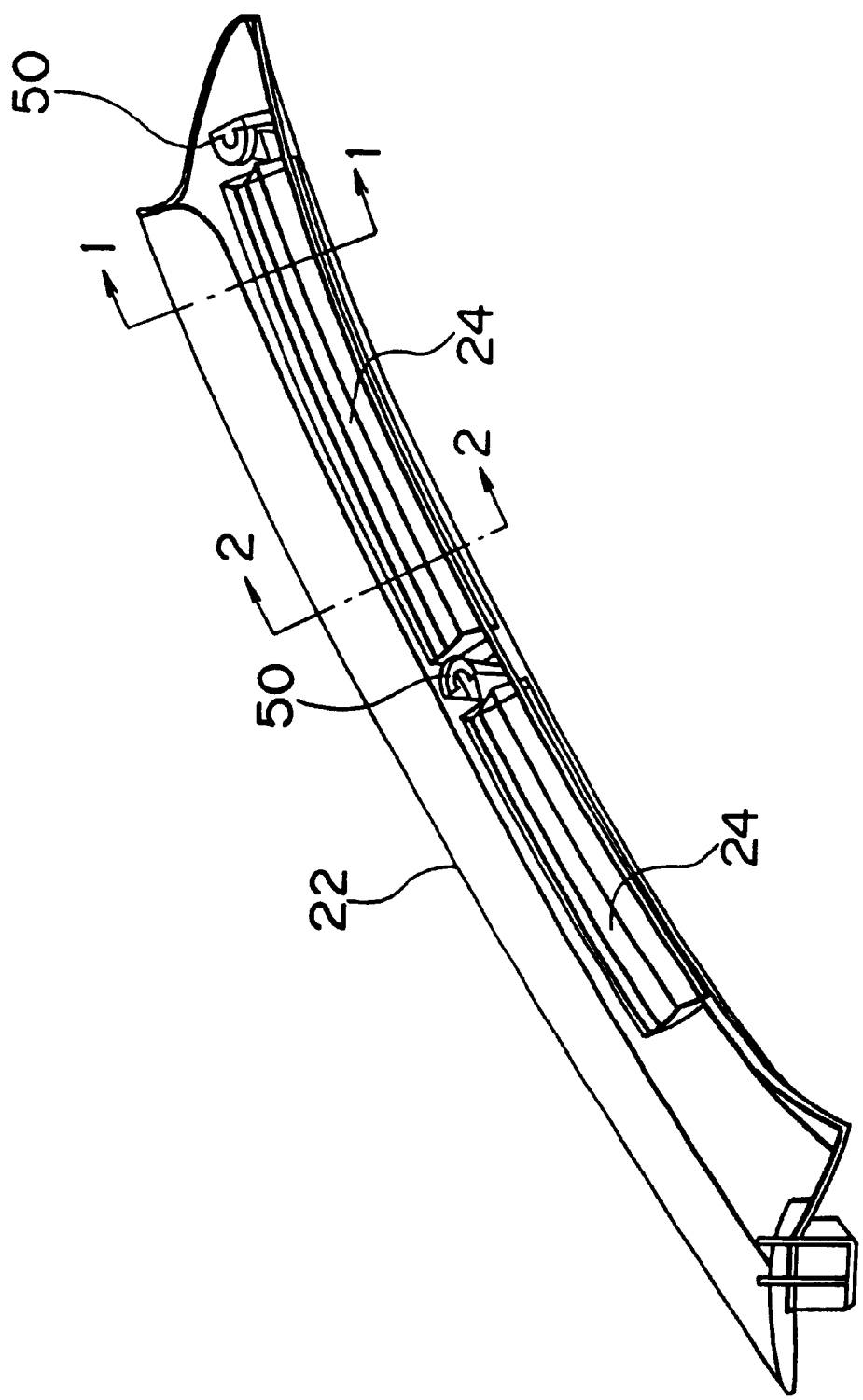
FIG. 3 is a perspective view of an interior member and a hollow body in the first embodiment of the invention viewed from outside the compartment.

A first embodiment of the automotive impact energy absorbing structure of the invention will be described with reference to the sectional views of FIGS. 1 and 2 and the perspective view of FIG. 3 showing an interior member viewed from outside a vehicular body. In an automotive impact energy absorbing structure according to the first embodiment, impact energy applied from a compartment interior is absorbed in an upper portion of the vehicle body provided with a structural member 20 and an interior member 22. The automotive impact energy absorbing structure includes a hollow body 24 for absorbing energy.

Figure 1:
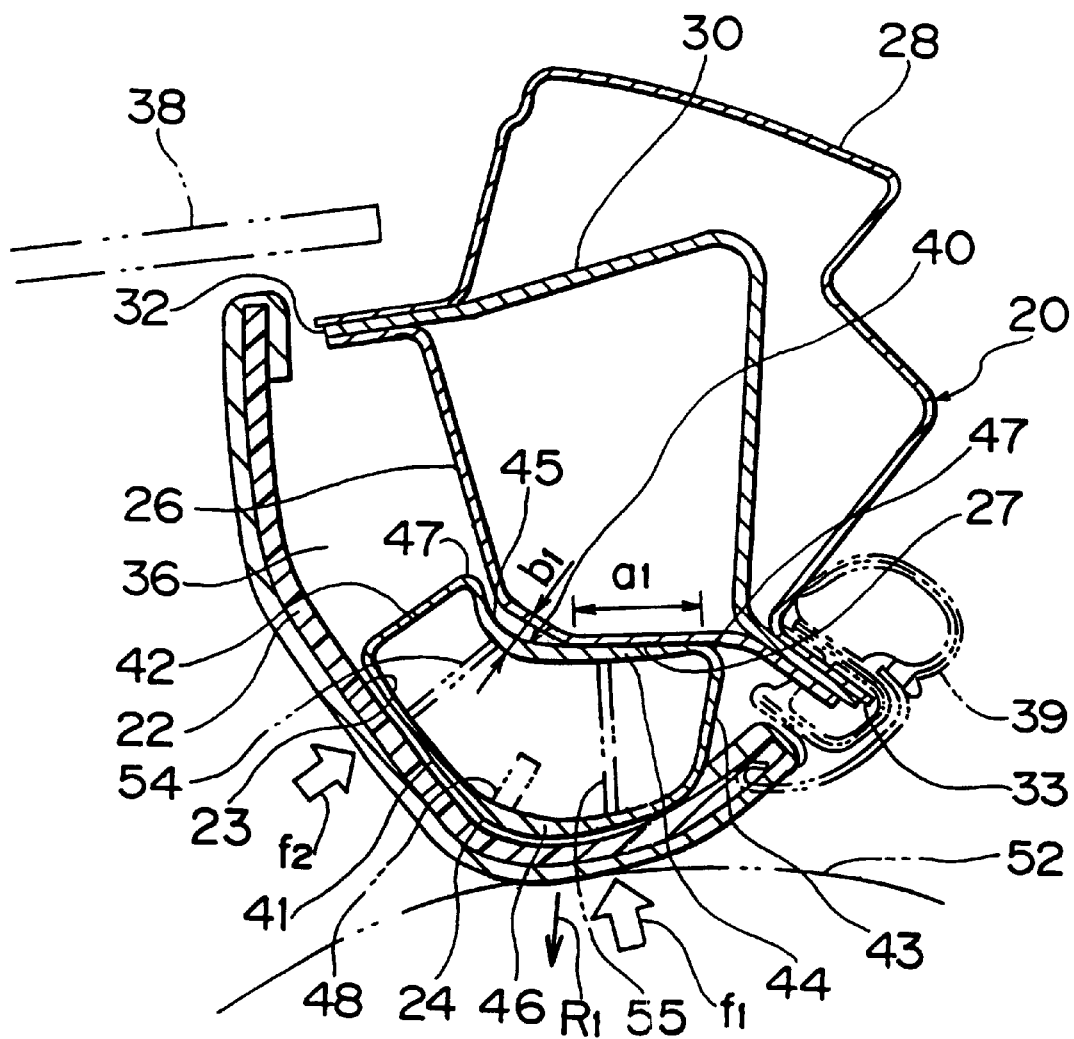
FIG. 1 is a sectional view of a first preferred embodiment of the automotive impact energy absorbing structure taken on line 1-1 of FIG. 3.

The structural member 20 in the first embodiment shown in FIGS. 1, 2 and 3 is, for example, a steel-made front pillar extending generally in a top-to-bottom direction relative to the vehicle body. The structural member 20 is formed of an inner panel 26 and an outer panel 28 spaced from the inner panel 26, toward the outside of the compartment. Furthermore, a reinforcing panel 30 is disposed between and spaced from the inner panel 26 and the outer panel 28. The structural member 20 has two flange-connected portions 32, 33 at which two flanges of the inner panel 26 and two corresponding flanges of the outer panel 28 are placed over and spot-welded to two corresponding flanges of the reinforcing panel 30. The structural member 20 has a closed configuration in a section taken on an imaginary plane perpendicular to a lengthwise axis of the structural member 20.

The interior member 22 is, for example, a pillar garnish formed from a hard resin, such as acrylonitrile butadiene styrene (ABS) or polypropylene (PP). The interior member 22 is spaced from the inner panel 26 of the structural member 20, in a direction $R_1$ toward the inside of the compartment, by an interval 36 needed for energy absorption. The interior member 22 extends along the length of the inner panel 26. The interval 36 varies in size depending at locations in the section, but may, for example, be determined within the range of 5 to 40 mm.

The hollow body 24 is disposed within the interval 36. The hollow body 24 is, for example, formed from aluminum by extrusion. Aluminum alloys, titanium, titanium alloys, magnesium or magnesium alloys may instead be used to form the hollow body 24. However, aluminum is preferred because it is relatively easy to form and is recyclable. In the first embodiment, as shown in FIGS. 1 through 3, the hollow body 24 is positioned near the flange-connected portion 33. In a case where the structural member 20 is used as a front pillar, a front windshield pane 38 is disposed near the other flange-connected portion 32. Loads imposed on the impact energy absorbing structure of the invention by an occupant will not be applied to the structural member at the flange-connected portion 32. Therefore, there is no need to dispose a hollow body in a portion of the interval 36 that is near the flange-connected portion 32. A opening trim 39 is attached to the flange-connected portion 33 to maintain the airtightness of a door (not shown).

In the first embodiment, as shown in FIG. 1, the hollow body 24 has a generally angular shape in a section taken on a plane perpendicular to the lengthwise axis of the hollow body 24. The generally angular sectional shape is formed by an outward wall portion 40 extending substantially along an inward surface 27 of the inner panel 26, an inward wall portion 41 extending substantially along an outward surface of the interior member 22, and two side wall portions 42, 43 connecting the outward wall portion 40 and the inward wall portion 41.

The hollow body 24 is fixed to the interior member 22 by, for example, inserting a plurality of fitting protrusions 48 protruding from the interior member 22 toward the outside of the compartment into corresponding holes in the hollow body 24, and then thermally riveting the fitting protrusions 48. An adhesive may instead be used to fix the hollow body 24 to the interior member 22.

The interior member 22 has two fitting seats 50 as shown in FIG. 3. Known resin-made clips (not shown) are fitted to the fitting seats 50, and then inserted into corresponding holes in the inner panel 26. The interior member 22 is thus attached to the inner panel 26.

Preferably, the hollow body 24 extends substantially over the entire length of the interior member 22. In the first embodiment, as shown in FIG. 3, the hollow body 24 substantially overlaps the fitting seats 50 in the direction of the length of the interior member 22, so that the hollow body 24 is formed of two sections separated by one of the fitting seats 50 that is provided in a central portion of the interior member 22. However, it is possible to use a single-body hollow body if the positions of the fitting seats are changed.

In the first embodiment, as shown in FIGS. 1 and 2, the outward wall portion 40 of the hollow body 24 has a contact portion 44 that contacts the inner panel 26, and a non-contact portion 45 spaced from the inner panel 26. The contact portion 44 of the outward wall portion 40 of the hollow body 24 contacting the inner panel 26 is near the flange-connected portion 33, and the non-contact portion 45 of the outward wall portion 40 is relatively remote from the flange-connected portion 33. The lengths $a_1$, $a_2$ of the contact portion 44 and the intervals $b_1$, $b_2$ between the non-contact portion 45 and the inner panel 26 vary depending on sections taken on planes perpendicular to an axis in the lengthwise direction of the structural member 20 as indicated in FIGS. 1 and 2. Such dimensional variations are largely based on the variation of the sectional shape of the structural member 20, for example, a front pillar, along the length thereof.

The hollow body 24 may be formed such that the wall thickness in a section taken on a plane perpendicular to an axis in the lengthwise direction of the structural member 20 varies locally in a peripheral direction. In the first embodiment, as shown in FIGS. 1 and 2, the contact portion 44 of the outward wall portion 40 of the hollow body 24 and a portion 46 of the inward wall portion 41 of the hollow body 24 substantially facing the contact portion 44 are thicker than the other wall portions of the hollow body 24. The thickness of the side wall portions 42, 43 is equal to the thickness of angled portions 47, and is the thinnest. For example, the greatest thickness of the inward wall portion 41 may be about 3 mm, and the greatest thickness of the outward wall portion 40 may be about 2 mm, and the thickness of the two side wall portions 42, 43 may be about 1 mm.

A side wall portion 43, that is, one of the two side wall portions 42, 43 closer to the flange-connected portion 33, is inclined to a direction of a load $f_1$ that is expected to be applied from an occupant 52. More specifically, the side wall portion 43 is inclined so that when the load $f_1$ is applied, the side wall portion 43 can fall or bend away from the flange-connected portion 33. Although no particular structure is provided in the hollow of the hollow body 24 in the first embodiment, it is also possible to provide a rib 54 and/or a rib 55 inside the hollow body 24 as indicated by broken lines in FIG. 1. The rib 55 extends in the direction of the load $f_1$, whereas the rib 54 extends in a different direction of a load $f_2$ that is also expected to be applied from the occupant 52.

In the first embodiment of the invention, the hollow body 24 deforms to absorb impact energy if at least a predetermined load is applied to the hollow body 24 by way of the interior member 22.

Since the hollow body 24 has a greater ductility than resin-made grating ribs, the hollow body 24 starts to plastically deform sooner relative to the amount of displacement than the conventional resin-made grating ribs. Therefore, the hollow body 24 can sufficiently absorb impact energy during an initial period of reception of a load. Furthermore, since the hollow body 24 has a closed configuration in a section taken on a plane perpendicular to the lengthwise axis of the hollow body 24, it is easy to adjust the extent of the area that receives load and the extent of the area that transmits load from the hollow body 24 to the inner panel 26.

The configuration and the dimensions of the hollow body 24 can be freely determined through extrusion forming. Therefore, it is possible to reduce the changes in energy absorbing characteristics depending on the direction of load application, by forming an optimal configuration of the entire hollow body 24 in accordance with the interval 36 between the inner panel 26 of the structural member 20 and the interior member 22, by locally varying the thickness of the hollow body 24 or by providing the ribs 52, 55 in the hollow of the hollow body 24.

The hollow body 24 is not substantially affected by atmospheric temperature or humidity. That is, the changes in the load bearing strength of the hollow body 24 depending on temperature or humidity are small, and the hollow body 24 does not undergo substantial deterioration over time due to the environment of use. Therefore, the hollow body 24 can retain intended impact energy absorbing characteristics.

If the hollow body 24 is formed from aluminum by extrusion, it is possible to re-process or reshape a deformed hollow body 24 for reuse since aluminum is suitable for recycling or reuse. The hollow body 24 can be made from materials other than metal, so long as the selected material plastically deforms sooner as compared, e.g., to conventional resin-made grating ribs, while at the same time maintains a predetermined impact energy absorbing capacity against the impact energy created by the impact.

Furthermore, the hollow body 24 has an angular shape. The inward wall portion 41 serves as a load-receiving area, and the outward wall portion 40 serves as an area through which the load transmitted to the hollow body 24 is transmitted to the inner panel 26. The two side wall portions 42, 43 maintain load. Since the angled portions 47 of the hollow body 24 are deformed to displace the hollow body 24 upon receiving a load, the maximum deformation displacement of the hollow body 24 can be increased.

If a load is applied to the hollow body 24 in a direction substantially perpendicular to the contact portion 44, the hollow body 24 undergoes deformation during which the non-contact portion 45 is displaced so as to contact the inner panel 26, with the contact portion 44 being the movement pivot. Therefore, a deformation displacement greater than the interval between the inner panel 26 and the interior member 22 can be secured, such that sufficient impact energy absorption can be achieved even if the interval is relatively small.

If a load is applied to the hollow body 24 in a direction substantially perpendicular to the non-contact portion 45, the hollow body 24 deforms without being substantially displaced, thereby absorbing impact energy.

If a load is applied to the hollow body 24 in a direction substantially perpendicular to the contact portion 44, the load acts on the hollow body 24 at a position relatively close to the flange-connected portion 33. The hollow body 24 thereby deforms and, simultaneously, the non-contact portion 45 is displaced so as to contact the inner panel 26, with the contact portion 44 being the movement pivot. Since the non-contact portion 45 is remote from the flange-connected portion 33, the hollow body 24 becomes displaced away from the flange-connected portion 33. The flange-connected portion 33 has a great rigidity, so that the flange-connected portion 33 of the structural member 20 produces a great reaction force to a load thereon. However, since the hollow body 24 is displaced away from the flange-connected portion 33, the influence of a reaction force from the flange-connected portion 33 is substantially avoided.

The hollow body 24 having different wall thicknesses in different positions in a peripheral direction can easily be produced by extrusion forming of a hollow body. Thereby it is possible to properly determine the magnitude of an initial load, the magnitude of load to be maintained, the extend of displacement of the hollow body 24, and so on.

If a load is applied to the hollow body 24 in a direction substantially perpendicular to the contact portion 44, a thick wall portion of the inward wall portion 41 receives the load so that deformation of the inward wall portion 41 in the direction of the load can be prevented during an initial period of the load application. Furthermore, since the contact portion 44 of the outward wall portion 40 has a relatively great thickness, deformation of the outward wall portion 40 in the direction of the load can also be prevented during an initial period. Because the inward wall portion 41 and the outward wall portion 40 are thus prevented from being deformed, and because the thin angled portions 47 of the inward wall portion 41 and the outward wall portion 40 become more likely to deform, application of a load to the hollow body 24 in a direction substantially perpendicular to the contact portion 44 causes the two side wall portions 42, 43 of the hollow body 24 to fall or bend so that the entire hollow body 24 is displaced in a direction perpendicular to the direction of the load. Furthermore, the hollow body 24 is displaced, with the contact portion 44 being the movement pivot, so that a great deformation displacement can be secured, and so that influence of a reaction force from the flange-connected portion 33 can be more effectively avoided. If a load is applied to the hollow body 24 in a direction substantially perpendicular to the non-contact portion 45, the inward wall portion 41 and the two side wall portions 42, 43 deform without a substantial displacement of the hollow body 24, thereby absorbing impact energy.

Figure 4:
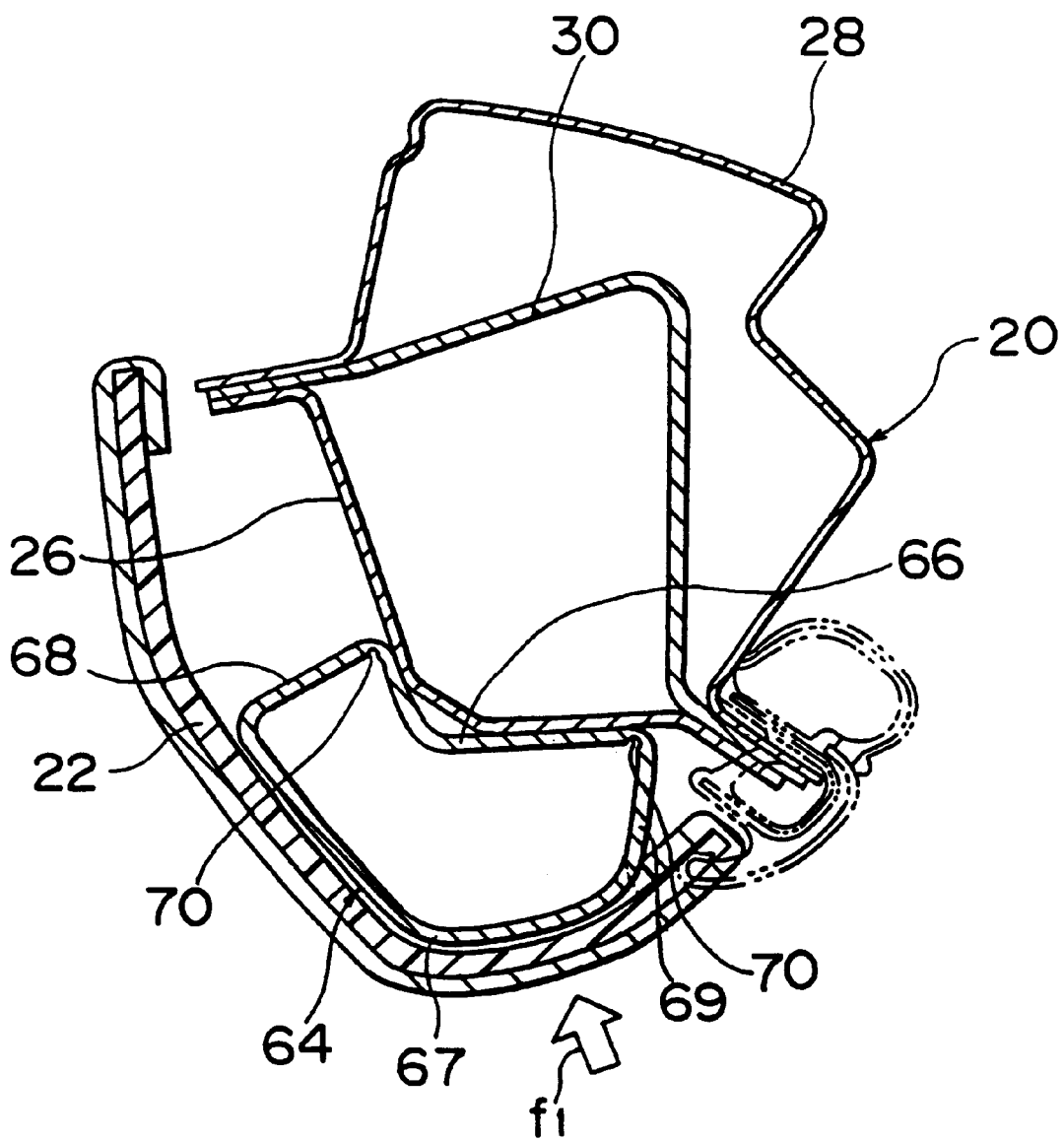
FIG. 4 is a sectional view of a second embodiment of the automotive impact energy absorbing structure of the invention taken on an imaginary plane perpendicular to a lengthwise axis of a structural member.

In a second embodiment of the invention as shown in FIG. 4, a hollow body 64 differs from the hollow body 24 shown in FIGS. 1 through 3. The hollow body 64, made, for example, from aluminum, has an outward wall portion 66, an inward wall portion 67 and two side wall portions 68, 69. The wall thickness of the hollow body 64 in a section taken on a plane perpendicular to an axis in the lengthwise direction of the structural member 20 varies locally. The outward wall portion 66 is shaped so that an intermediate portion thereof in a section taken on a plane perpendicular to an axis in the lengthwise direction of the structural member 20 is spaced from an inner panel 26 and other portions of the outward wall portion 66 are in contact with the inner panel 26. The hollow body 64 further has notches 70 that are formed in angled portions between the outward wall portion 66 and the side wall portions 68, 69. Upon receiving a load, the notches 70 induce the side wall portions 68, 69 to fall or bend in and maintain a substantially constant bending load during the process of the bending deformation of the side wall portions 68, 69.

Figure 5:
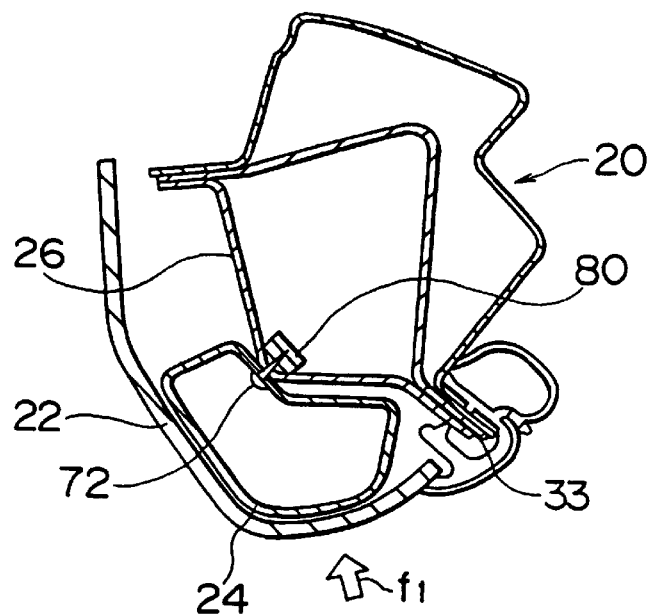
FIG. 5 is a sectional view of a third embodiment of the automotive impact energy absorbing structure of the invention taken on an imaginary plane perpendicular to a lengthwise axis of a structural member.
Figure 6:
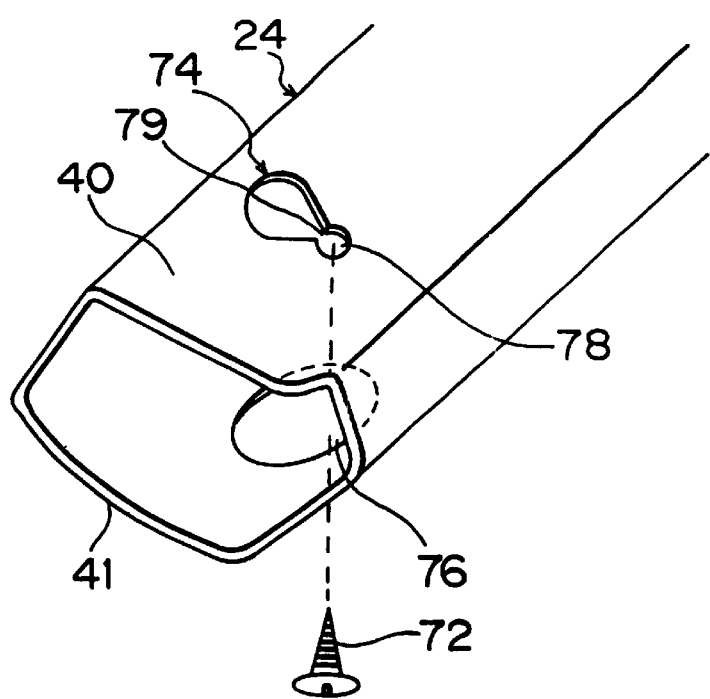
FIG. 6 is a perspective view of a hollow body in the third embodiment of the invention viewed from outside the compartment.

In a third embodiment as shown in FIGS. 5 and 6, a hollow body 24 may be attached to an inner panel 26 using a fasting device 72. The hollow body 24 has a through hole 74 that is formed in an outward wall portion 40 for inserting the fastening device 72, and another hole 76 formed in an inward wall portion 41. The hole 74 of the outward wall portion 40 is defined by a positioning portion 78 for holding the hollow body 24 at a predetermined position, and by a deforming portion 79 for displacement of the hollow body 24 relative to the fastening device 72. The fastening device 72 shown in FIGS. 5 and 6 is, as an example, a tapping screw.

The hollow body 24 is fixed to the inner panel 26 by inserting the fastening device 72 through the hole 76 and into the positioning portion 78 of the hole 74, and then screwing the fastening device 72 into a grommet member 80 fixed to an inner panel 26. When a load $f_1$ is applied, the deforming portion 79 of the hole 74 of the hollow body 24 deforms allowing the hollow body 24 to shift relative to the fastening device 72 so that the hollow body 24 moves away from flange-connected portion 33.

If the fastening device 72 is disposed at a suitable position and a load is applied to the hollow body 24 in a certain direction, the load displaces the hollow body 24 while deforming the deforming portion 79. An increased deformation displacement can thus be achieved. Furthermore, deformation of the deforming portion 79 absorbs impact energy.

Figure 7:
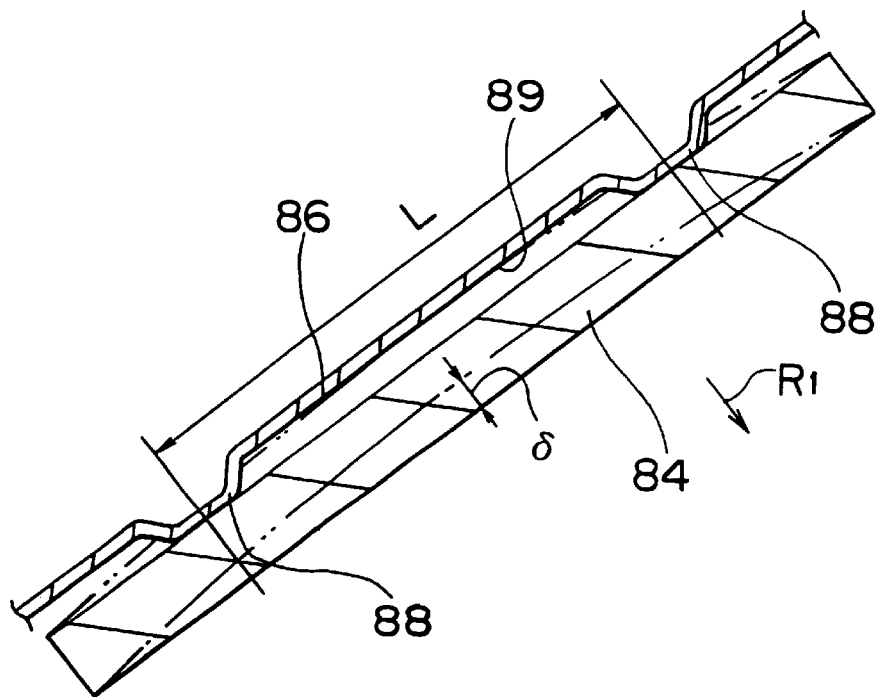
FIG. 7 is a sectional view of a fourth embodiment of the automotive impact energy absorbing structure of the invention taken on an imaginary plane along a lengthwise axis of a structural member.
Figure 8:
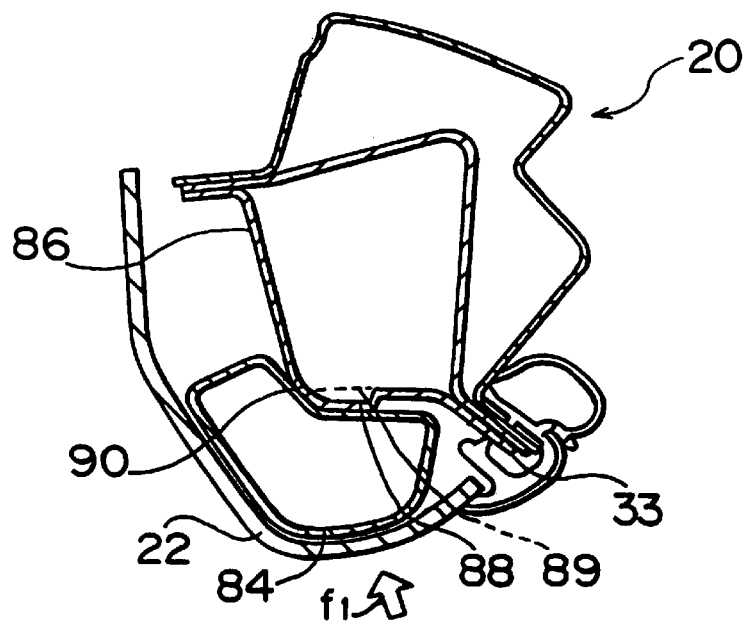
FIG. 8 is a sectional view of the fourth embodiment of the automotive impact energy absorbing structure of the invention taken on an imaginary plane perpendicular to the lengthwise axis of the structural member.

In a fourth embodiment as shown in FIGS. 7 and 8, an inner panel 86 has a plurality of support portions 88 that contact a hollow body 84 made from, for example, aluminum. The support portions 88 are raised in the form of protuberances in a direction $R_1$ to the inside of a compartment. The support portions 88 are arranged in the direction of the length of the inner panel 86 and spaced by intervals L. In the fourth embodiment as shown in FIGS. 7 and 8, the support portions 88 of the inner panel 86 are sloped so that when a load $f_1$ equal to or greater than a predetermined value is applied, the hollow body 84 can shift in a direction away from the flange-connected portion 33. More specifically, the support portions 88 are raised by drawing them from a surface 89 of the inner panel 86 in such a manner that the height of the slope surface of each support portion 88 increases as the distance to the flange-connected portion 33 decreases.

When a load equal to or greater than the predetermined value is applied, the hollow body 84 undergoes elastic and plastic deformation δ as indicated by a broken line in FIG. 7, and then further deforms plastically. Since the support portions 88 are sloped in the fourth embodiment, the hollow body 84, upon receiving a load, is displaced sliding on the support portions 88 and, therefore, shifting away from the flange-connected portion 33. The outward wall portion 90 of the hollow body 84 is formed such that a portion of the outward wall portion 90 that is relatively close to the flange-connected portion 33 contacts the support portions 88 of the inner panel 86.

The hollow body 84 has, in the direction of the length of the structural member 20, portions that contact the support portions 88 of the inner panel 86 and portions that are apart from the inner panel 86. Therefore, when a load is applied to the entire hollow body 84, the portions apart from the inner panel 86 bend, with the support portions 88 acting as fulcrums, thus deforming elastically and plastically. This deformation absorbs impact energy. After that, the hollow body 84 is squeezed while continuing to plastically deform, thereby absorbing impact energy. The combination of elastic deformation and plastic deformation of the hollow body 84 occurring during the bending of the hollow body 84 adds to the initial deformation load. The magnitude of the initial deformation load can be varied by adjusting the intervals between the support portions 88.

When a load is applied to the hollow body 84, portions of the hollow body 84 between the support portions 88 of the inner panel 86 elastically deform and, simultaneously, the hollow body 84 shifts in such a direction as to move away from the flange-connected portion 33. In this embodiment, since the hollow body 84 is supported only by the support portions 88, the load applied to the individual support portions 88 is greater than the load that would be applied if the entire hollow body 84 is supported by full surface contact. The friction on the support portions 88 is thus increased. However, because the support portions 88 receive greater loads, the transition from a static friction to a dynamic friction state, that is, the arrival at a threshold load at which the hollow body 84 starts to slide occurs sooner. Thus, the hollow body 84 starts to slide earlier, thereby increasing the entire deformation displacement.

Figure 9:
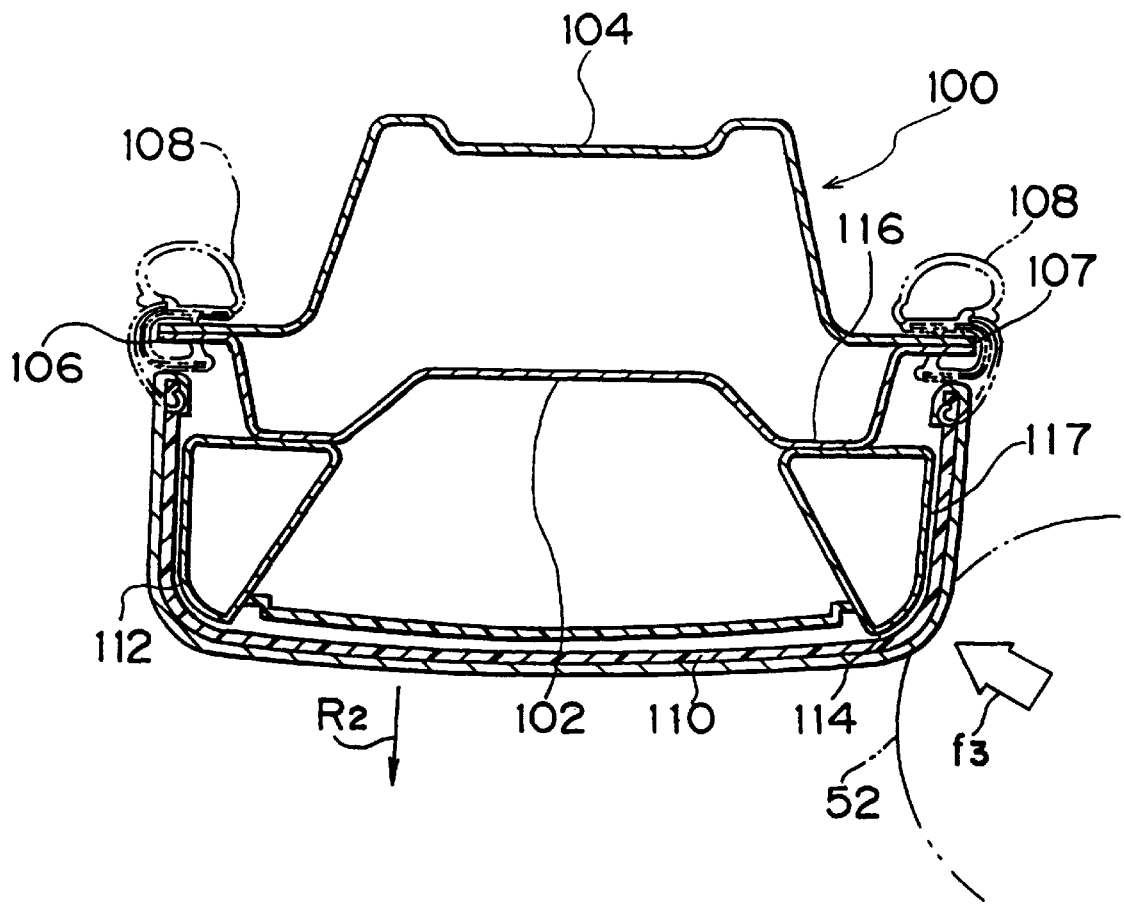
FIG. 9 is a sectional view of a fifth embodiment of the automotive impact energy absorbing structure of the invention taken on an imaginary plane perpendicular to a lengthwise axis of a structural member.

In a fifth embodiment as shown in FIG. 9, a structural member 100 is, for example, a center pillar extending substantially in a top-and-bottom direction relative to a vehicle body. The structural member 100 includes an inner panel 102 and an outer panel 104. The structural member 100 has two flange-connected portions 106, 107 at which flanges of the inner panel 102 are connected to flanges of the outer panel 104. An opening trim 108 is attached to each of the flange-connected portions 106, 107. An interior member 110 is spaced from the inner panel 102 by an interval in a direction $R_2$ to the inside of a compartment. The interior member 110 is, for example, a pillar garnish. Two hollow bodies 112, 114, made, for example, from aluminum, are disposed within the aforementioned interval, near the flange-connected portions 106, 107.

The structural member 100 receives a load $f_3$ from, for example, a rearward occupant 52, in such a manner as indicated in FIG. 9. The load from a forward occupant is applied to the structural member 100 in a manner that is substantially symmetrical to the manner of application of the load $f_3$ in the right-and-left direction in FIG. 9. Therefore, the two hollow bodies 112, 114 are formed in symmetrical angular shapes. It is preferred that a bottom side portion of each hollow body 112, 114 be fixed to the inner panel 102 so that when a load from the occupant 52 is applied, a side portion 117 falls or bends toward the bottom side portion 116.

Figure 10:
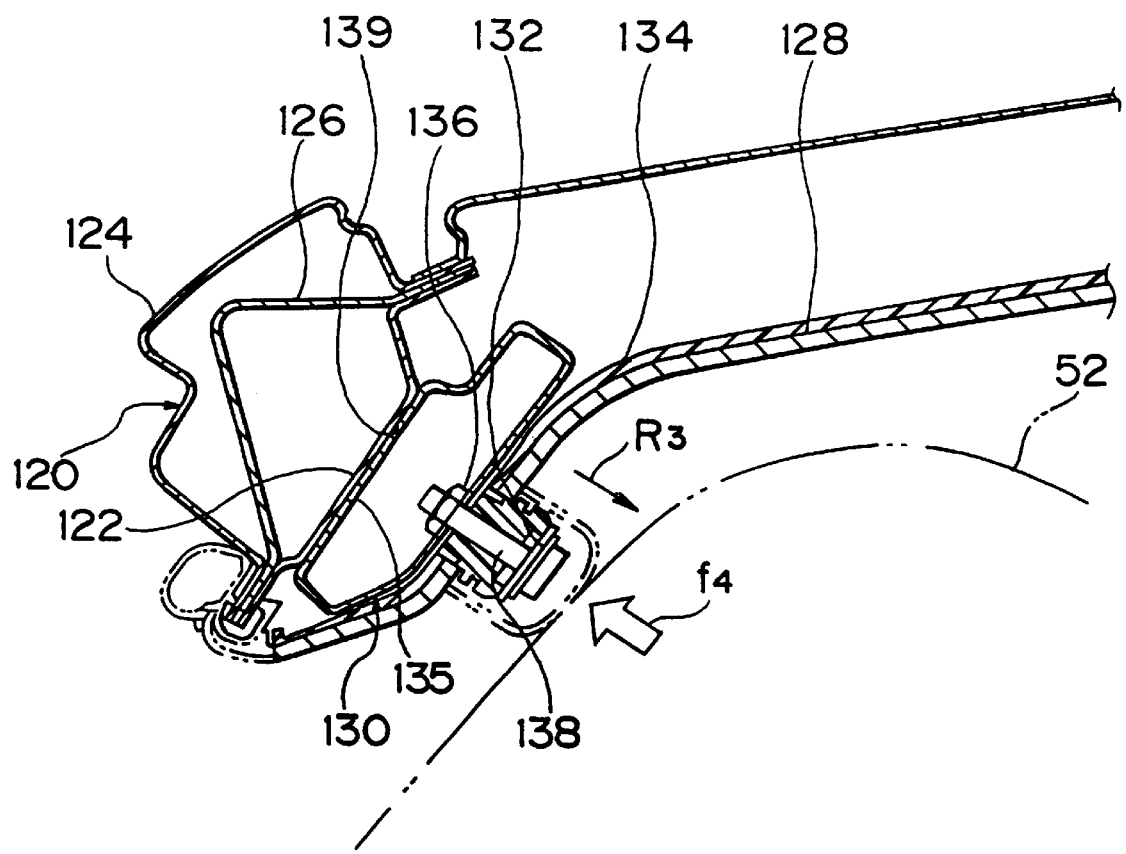
FIG. 10 is a sectional view of a sixth embodiment of the automotive impact energy absorbing structure of the invention taken on an imaginary vertical plane that perpendicular to a center axis extending in a front-to-rear direction relative to a vehicular body.

In a sixth embodiment as shown in FIG. 10, a structural member 120 is, for example, a roof side rail extending in a front-and-rear direction relative to a vehicle body. The structural member 120 includes an inner panel 122, an outer panel 124 and a reinforcing panel 126. An interior member 128 is spaced from the inner panel 122 by an interval in a direction $R_3$ to the inside of a compartment. The interior member 128 is, for example, a roof trim in this embodiment. A hollow body 130, made, for example, from aluminum, is disposed in the aforementioned interval, extending over a predetermined length along the structural member 120 in the front-to-rear direction relative to the vehicle body. The hollow body 130 is fixed by screws (not shown) to the inner panel 122 of the roof side rail 120, and supports a grab handle 132.

The grab handle 132 is mounted on an inward wall portion 134 of the hollow body 130 by screwing a bolt 138 extending through opposite ends of the grab handles 132 into a nut 136 welded in the inward wall portion 134. It is preferred that the inner panel 122 and an outward wall portion 135 of the hollow body 130 have holes that form a hole 139 corresponding to the nut 136 in order to prevent the bolt 138 from striking the outward wall portion 135 or the inner panel 122.

When a load $f_4$ from an occupant 52 is applied to the grab handle 132, the load is transmitted by the bolt 138 to the inward wall portion 134 so that the inward wall portion 134 plastically deforms, absorbing impact energy. Since the bolt 138 and the nut 136 move into the hole 139, the entire hollow body 130 can sufficiently undergo plastic deformation without bottom striking of the bolt 138 or the nut 136 on the outward wall portion 135 or the inner panel 122. Therefore, the amount of protrusion of the bolt 138 into the compartment is reduced.

Since the hollow body 130 extends along the structural member 120 in the front-and-rear direction relative to the vehicle body, the holding strength of a portion where the grab handle 132 is mounted is greater than the holding strength provided in a construction where a grab handle is mounted on a mounting seat such as a bracket. However, the mounting of the grab handle 132 at limited sites in the hollow body 130 extending in the front-and-rear direction of the vehicle does not substantially vary the energy absorbing characteristics of the hollow body 130 in the front-and-rear direction. Therefore, substantially uniform energy absorbing characteristics can be obtained.

Figure 11:
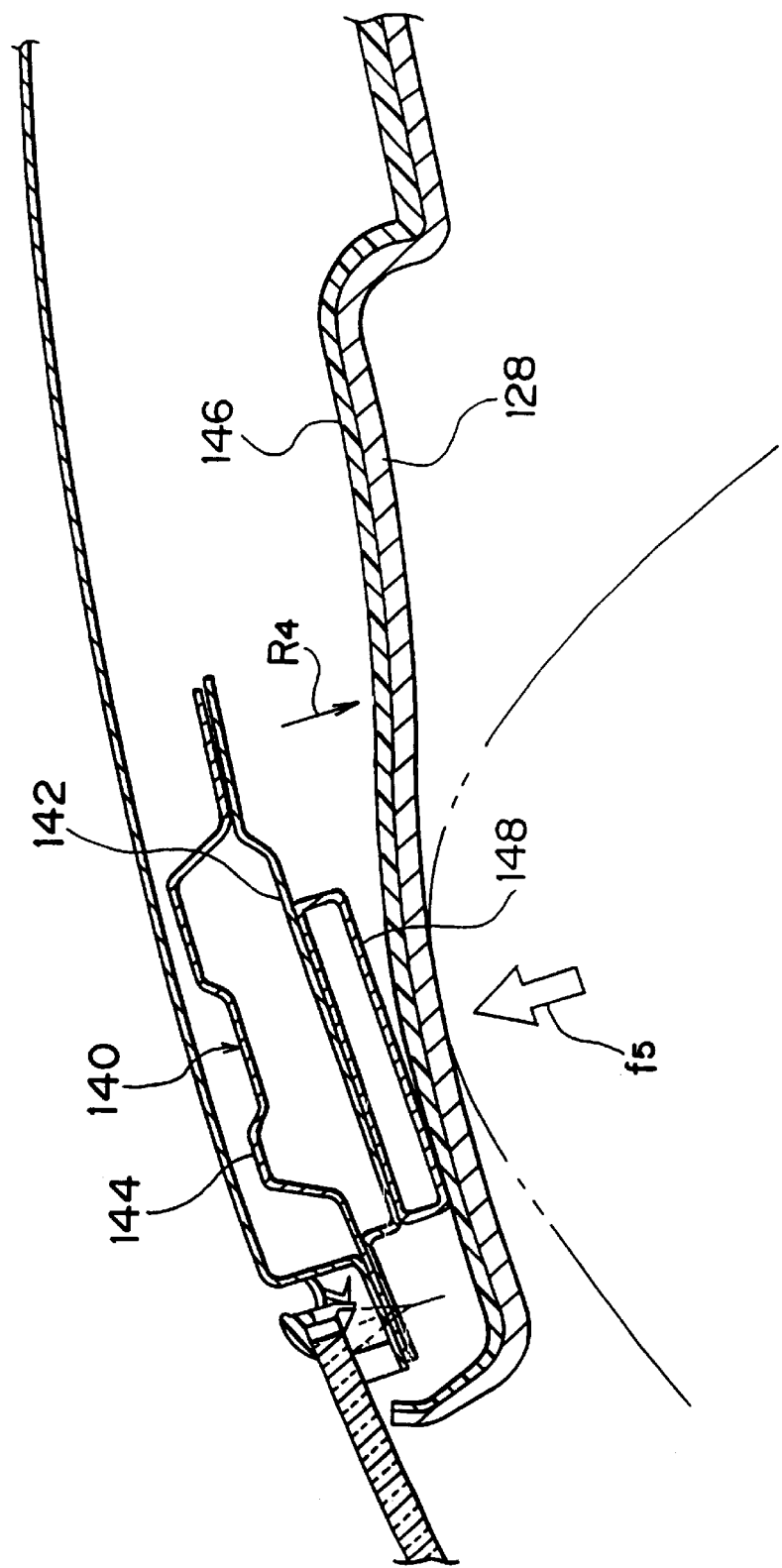
FIG. 11 is a sectional view of a seventh embodiment of the automotive impact energy absorbing structure of the invention taken on an imaginary vertical plane that includes a center axis extending in a front-to-rear direction relative to a vehicular body.

In a seventh embodiment as shown in FIG. 11, a structural member 140 is, for example, a header extending transversely relative to a vehicle body. The structural member 140 includes an inner panel 142 and an outer panel 144. An interior member 146 is spaced from the inner panel 142 by an interval in a direction $R_4$ toward the inside of a compartment. The interior member 146 is, for example, a roof trim in this embodiment. A hollow body 148 is disposed in the aforementioned interval. The hollow body 148 has a rectangular sectional shape. In this embodiment, upon receiving a load $F_5$, the hollow body 148 undergoes plastic deformation without being displaced.

Some of the operations of the impact energy absorbing structure according to the invention will now be explained. In the first embodiment as shown in FIGS. 1 through 3, when the load $f_1$ is applied, mainly the inward wall portion 41 and the side wall portion 43 of the hollow body 24 deform from the load. Therefore, the deformation load rises as indicated by $B_1$ in the graph of FIG. 12. When the deformation load reaches a peak value $B_2$, the non-contact portion 45 of the outward wall portion 40 starts to be displaced toward the inner panel 26, with the contact portion 44 acting as a movement center, so that the deformation load decreases as indicated by $B_3$. The deformation load continues to decrease until the non-contact portion 45 sufficiently contacts the inner panel 26 so that the deformation load reaches a minimum value $B_4$. When the non-contact portion 45 is in sufficient contact with the inner panel 26, mainly the inward wall portion 41 and the side wall portions 42, 43 plastically deform. Therefore, the deformation load rises again, to reach a second peak value $B_5$. After that, the deformation load gradually decreases.

Figure 12:
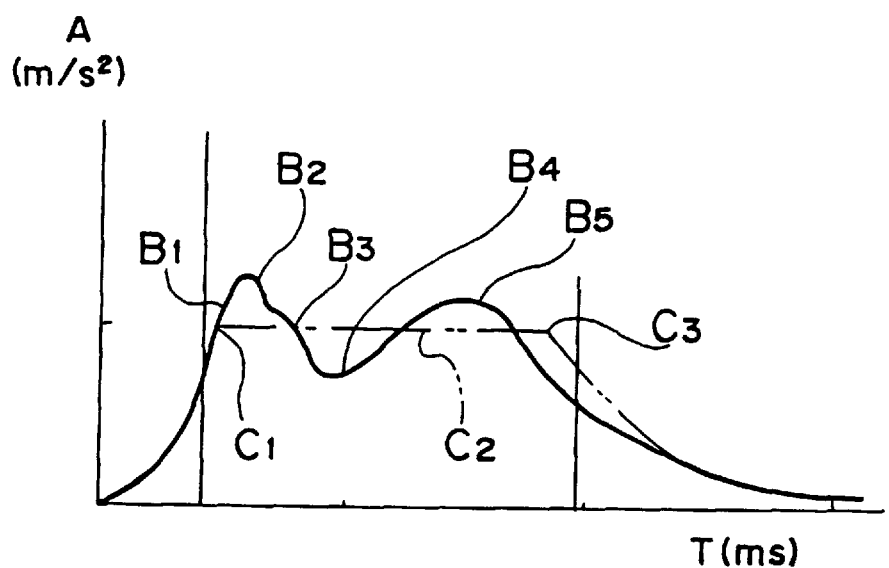
FIG. 12 shows an impact energy absorbing characteristic curve indicating the relationship between acceleration and time regarding the first and second embodiments.
Figure 13:
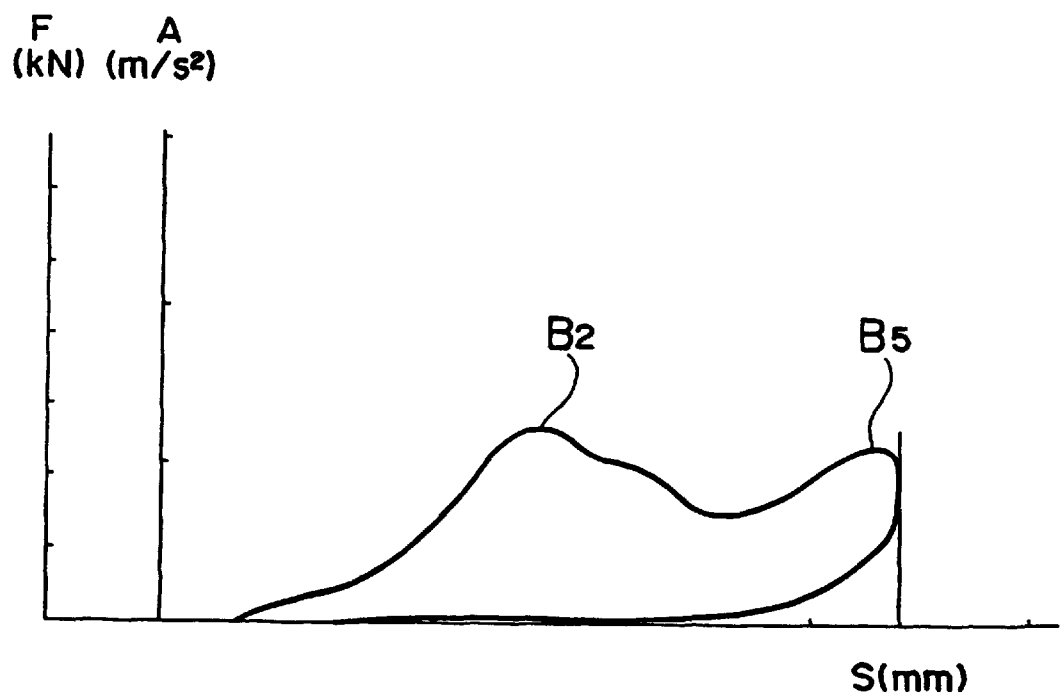
FIG. 13 shows an impact energy absorbing characteristic curve indicating the relationship among acceleration, load and displacement regarding the first embodiment.
Figure 14:
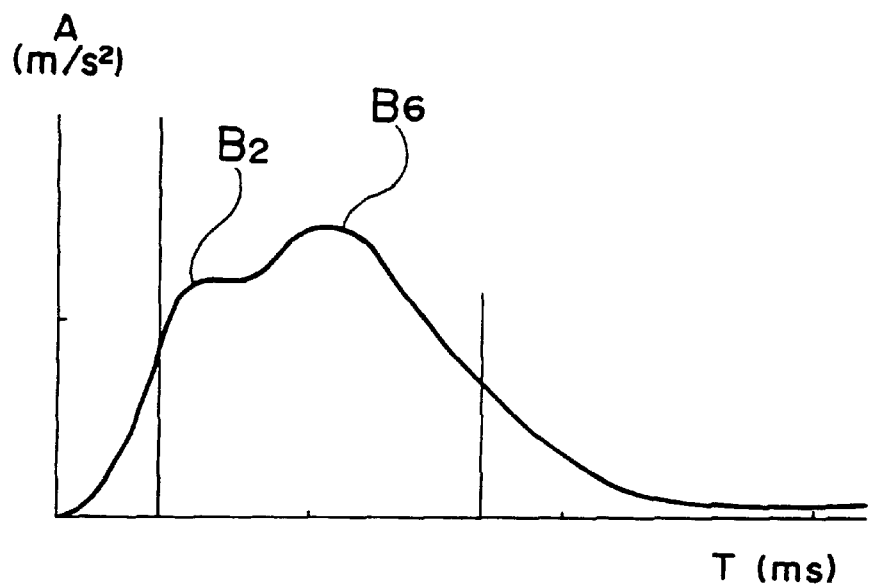
FIG. 14 shows an impact energy absorbing characteristic curve indicating the relationship between acceleration and time regarding a comparative example.
Figure 15:
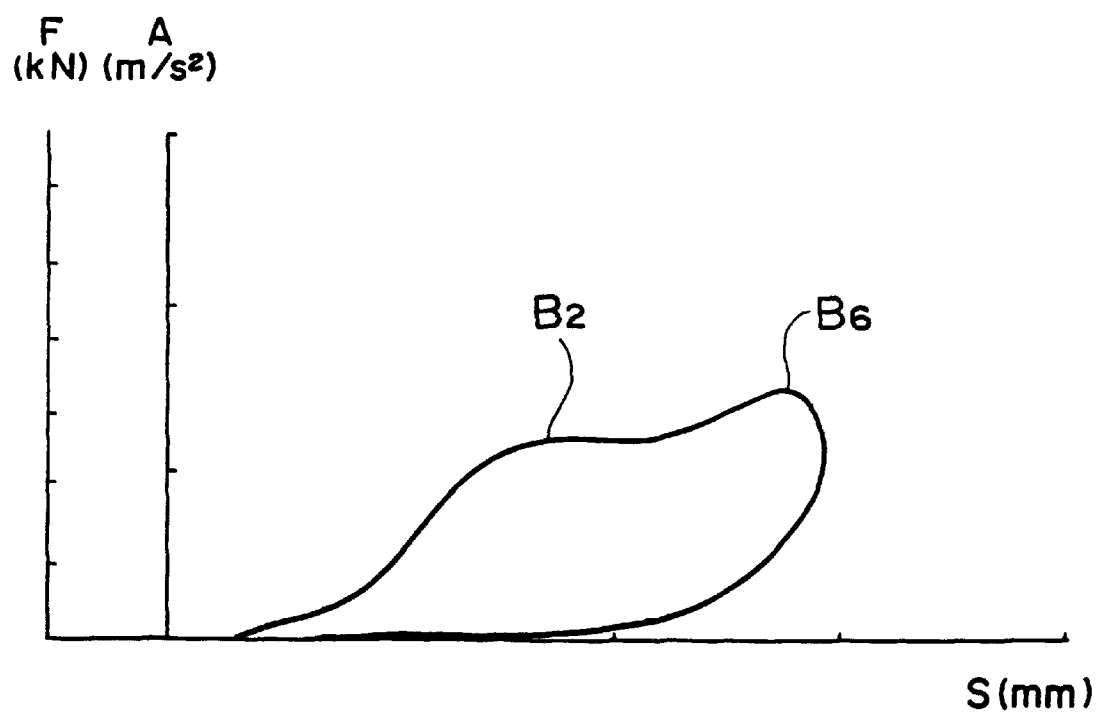
FIG. 15 shows an impact energy absorbing characteristic curve indicating the relationship among acceleration, load and displacement regarding a comparative example.

A test was performed on a hollow body wherein the non-contact portion 45 was not provided but the outward wall portion 40 was set in substantially full contact with the inner panel 26. Results are indicated in FIG. 14. After the deformation load reached point $B_2$, the hollow body continued deforming plastically and the deformation load reached a peak value $B_6$. The amounts of impact energy absorbed are indicated by areas defined by the curves in FIGS. 12 and 14. Those areas in FIGS. 12 and 14 are substantially equal. Therefore, it can be seen that by providing two peak values as indicated in FIG. 12, the maximum peak value can be reduced.

In the second embodiment as shown in FIG. 4, when the load f, is applied, mainly the inward wall portion 67 and the side wall portion 69 of the hollow body 64 plastically deform from the load. The deformation load thus rises. Then, the notch 70 induces the side wall portion 69 to fall or bend in. After the deformation load reaches a load $C_1$ indicated in FIG. 12, mainly bending deformation of the side wall portion 69 proceeds. Therefore, the deformation load remains substantially constant as indicated by $C_2$. After a point $C_3$ is reached, the deformation load decreases. Therefore, this embodiment also reduces the maximum peak value.

Figure 16:
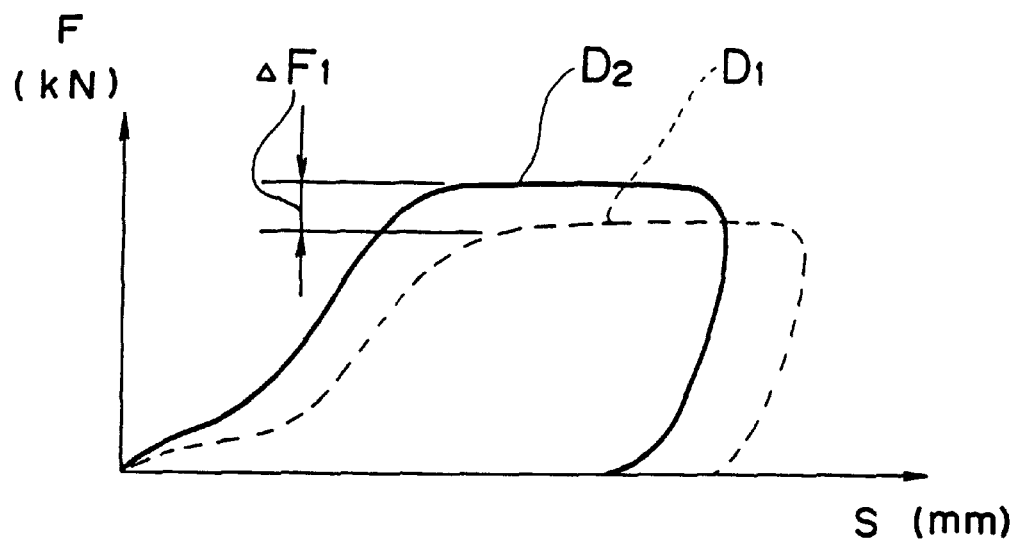
FIG. 16 shows impact energy absorbing characteristic curves indicating the relationship between load and displacement regarding the fourth embodiment of the invention.
Figure 17:
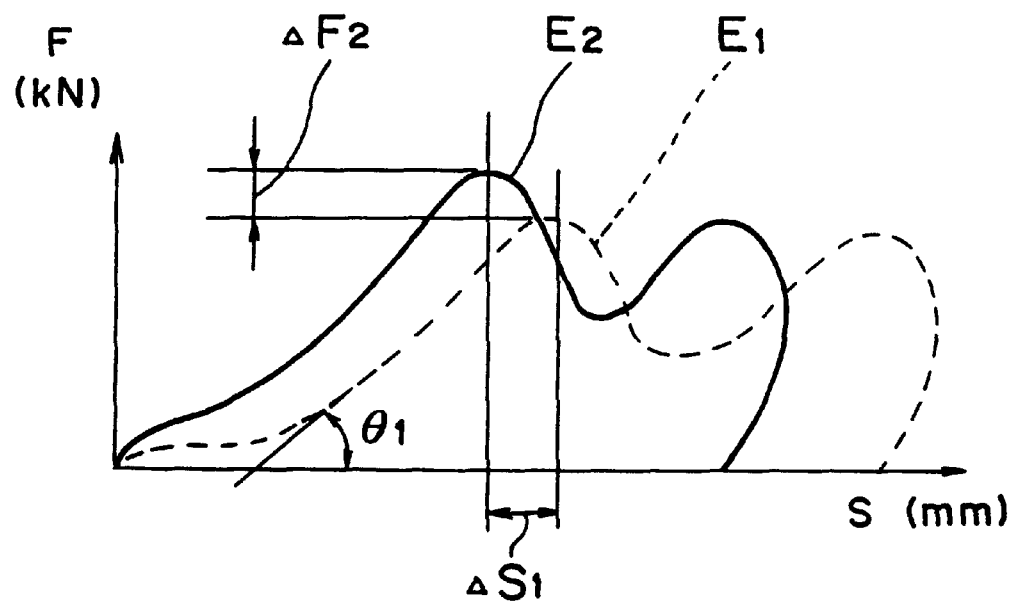
FIG. 17 shows impact energy absorbing characteristic curves indicating the relationship between load and displacement regarding the fourth embodiment and a comparative example.

In the fourth embodiment as shown in FIG. 7, provision of the support portions 88 achieves an earlier rising of an initial load as indicated by $D_2$ in FIG. 16. If protruding support portions are not provided, the deformation load changes as indicated by $D_1$. In the fourth embodiment, an additional deformation load $\Delta F_1$ due to the aforementioned bending increases the peak load. Therefore, overall energy efficiency improves. FIG. 17 shows an impact energy absorbing characteristic curve $E_1$ of a construction that does not have a support portion and an impact energy absorbing characteristic curve $E_2$ of a construction that has support portions and induces displacement. As can be seen in FIG. 17, the deformation load as indicated by $\Delta F_2$, the initial load gradient $\theta_1$, and the initial load rising displacement as indicated by $\Delta S_1$ are caused by the bending of the hollow body with a support portion.

The impact energy absorbing structure will be described with reference to the sectional views of FIGS. 18-22 taken on planes perpendicular to the lengthwise axis of the structure. The impact energy absorbing structure provided in an upper portion of a motor vehicle body for absorbing impact energy includes a structural member 20 extending in the lengthwise direction, an interior member 22 made, for example, from resin and spaced from the structural member 20 on a compartment side by an interval 36 required for energy absorption, and a hollow body 24 made, for example, from metal.

The structural member 20 includes an inner panel 26, and an outer panel 28 spaced from the inner panel 26 by an interval extending toward the outside of the compartment, and a reinforcing panel 30 disposed between the inner panel 26 and the outer panel 28. Flanges of these panels are connected together by welding, thereby forming a closed structure.

Figure 18:
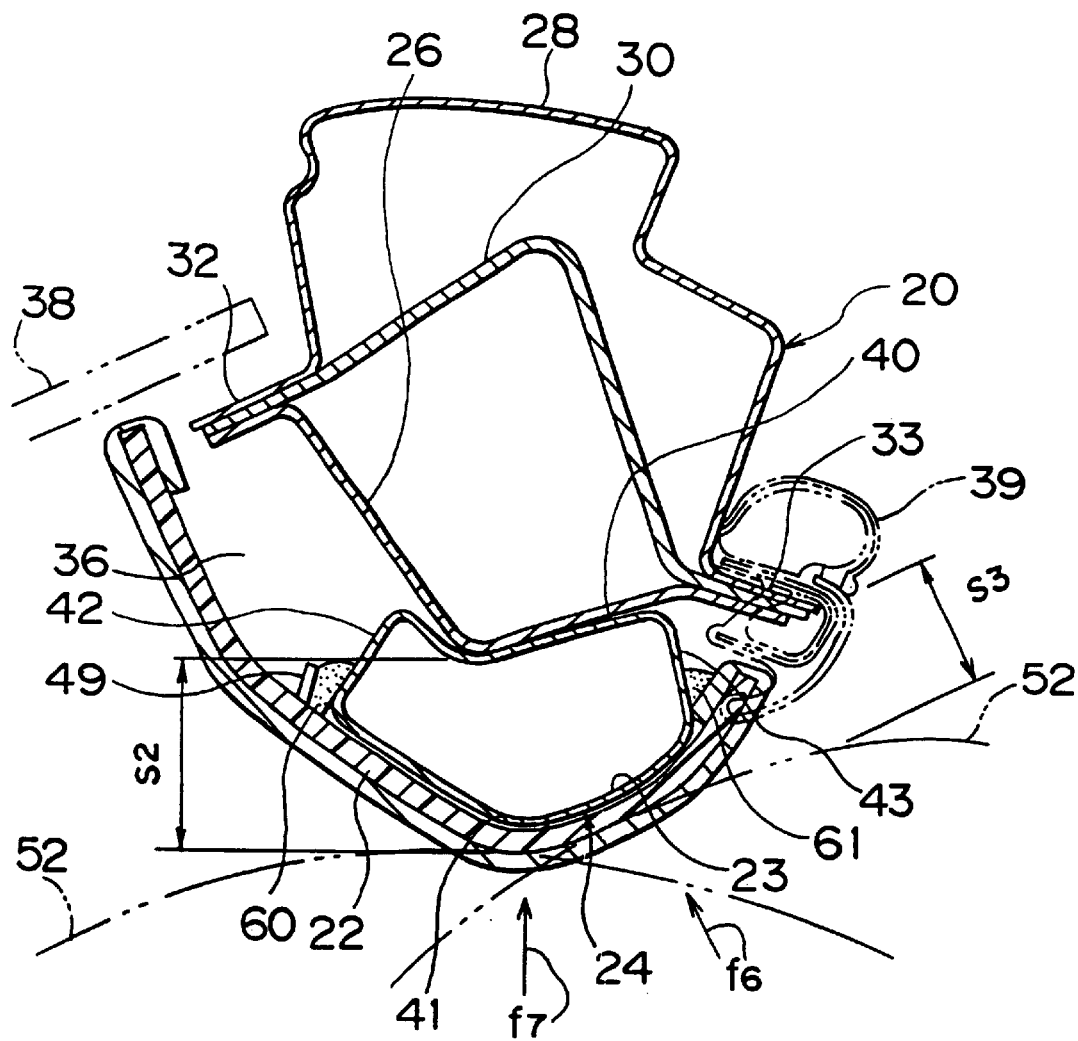
FIG. 18 is a sectional view of an eighth embodiment of the automotive impact energy absorbing structure of the invention, taken on an imaginary plane perpendicular to a lengthwise axis of a structure member.

In an eighth embodiment as shown in FIG. 18, the structural member 20 is, for example, a front pillar extending substantially in a top-and-bottom direction relative to a vehicle body. The structural member 20 has two flange-connected portions 32, 33. A front windshield pane 38 can be disposed near a flange-connected portion 32. An opening trim 39 can be connected to the other flange-connected portion 33.

The interior member 22 is, for example, a pillar garnish and is spaced from the inner panel 26 by the interval 36. The interval 36 varies in size depending on locations. The size of the interval 36 may be determined, for example, within the range of 5 to 40 mm.

The hollow body 24 is disposed within the interval 36, near the flange-connected portion 33. The hollow body 24 is formed, for example, of aluminum by extrusion. The hollow body 24 has an angular configuration in a section taken on a plane perpendicular to the lengthwise axis thereof. The angular configuration is substantially formed by an inward wall portion 41 facing the interior member 22, an outward wall portion 40 facing the inner panel 26 of the structure member, and two side wall portions 42, 43 connecting between the inward wall portion 41 and the outward wall portion 40. The thickness of the individual wall portions of the hollow body 24 may be determined as a constant thickness of, for example, about 1 mm or may vary within the range of, for example, about 1 to 3 mm. As shown in the perspective view of FIG. 22, the hollow body 24 extends along the length of the interior member 22.

The hollow body 24 is adhered to an outward surface 23 of the interior member 22 so that the axis of the hollow body 24 extends in the direction of the length of the structural member 20. The hollow body 24 is disposed within the interval 36. In the eighth embodiment as shown in FIGS. 18 and 19, the hollow body 24 is adhered to the outward surface 23 of the interior member 22, by an adhesive 60 at the side wall portion 42 and by an adhesive 61 at the side wall portion 43.

Figure 19:
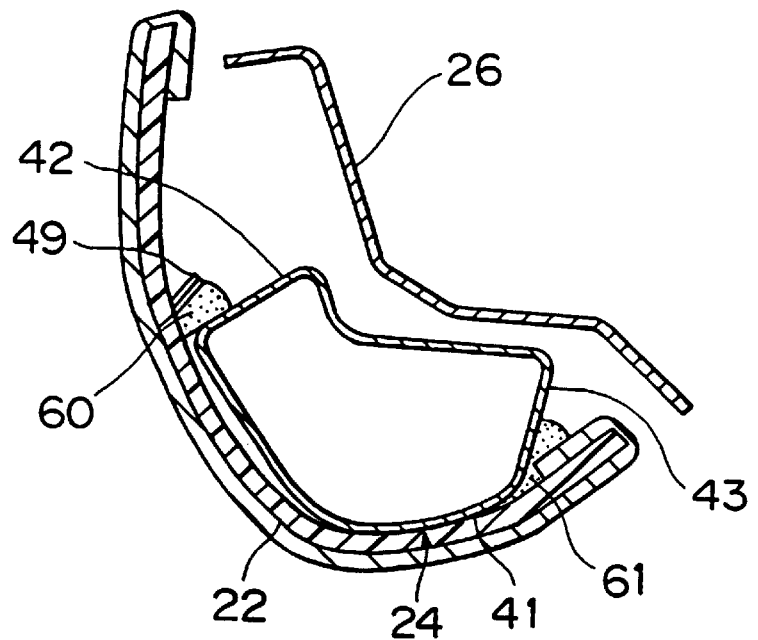
FIG. 19 is another sectional view of the eighth embodiment of the automotive impact energy absorbing structure of the invention, taken on a different imaginary plane perpendicular to a lengthwise axis of a structure member.

The adhesives 60, 61 are, for example, a synthetic rubber-based hot melt adhesive in the eighth embodiment shown in FIGS. 18 and 19. The adhesive may be a synthetic rubber based adhesive, a urethane-based adhesive, an epoxy-based adhesive, an acryl-based adhesive, a polyolefin-based adhesive, a polyester-based adhesive or a polypropylene-based adhesive, as examples.

The adhesives 60, 61 are applied over the entire length of the hollow body 24. However, it is not necessary to uniformly apply the adhesive at each location in the lengthwise direction. As is apparent from FIGS. 18 and 19, the hollow body 24, formed, for example, by extrusion forming, has a constant sectional shape and constant dimensions over the entire length, but the sectional shape and the dimensions of the interior member 22 may vary in the lengthwise direction. Therefore, to secure appropriate adhesion, it is preferred that the amount of the adhesive 60 applied between the side wall portion 42 and the interior member 22 as indicated in FIG. 19 be increased or the adhesive 61 between the side wall portion 43 and the interior member 22 be pressed into the gap between the interior member 22 and the inward wall portion 41 as indicated in FIG. 19.

Since the adhesive 61 is applied to an acute angle portion formed by the interior member 22 and the side wall portion 43 in FIGS. 18 and 19, the angle portion maintains an applied state. On the other hand, the angle formed by the interior member 22 and the side wall portion 42 is essentially obtuse, so that it is difficult to keep the adhesive 60 in the applied state. Therefore, a restricting device 49 is provided for keeping the adhesive in the applied state. The amount of the adhesive 60 applied can be restricted by a height of the restricting device 49 and a distance of the restricting device 49 from the side wall portion 42. Furthermore, the area of the adhesive applied can also be restricted by the distance of the restricting device 49 from the side wall portion 42. The restricting device 49 is, for example, rib protruding integrally from the interior member 22 in the eighth embodiment.

In the example of the eighth embodiment discussed above, since the interior member 22 is made from a resin and the hollow body 24 is made, e.g., from a metal, the interior member 22 and the hollow body 24 have different ductilities. Therefore, if a load equal to or greater than a predetermined value is transmitted to the hollow body 24 by the interior member 22, a relative displacement occurs at adhering portions between the two members, so that the sheering force based on the relative displacement acts on the adhesives 60, 61. The reaction force to the sheering force also absorbs impact energy, thereby achieving energy absorbing characteristics different from the original energy absorbing characteristics of the hollow body 24. Furthermore, a change in the adhering manner can also change the energy absorbing characteristics.

Since the hollow body 24 can be formed into any desired sectional shape through, for example, extrusion forming, the hollow body 24 can easily be adapted to the interval 36 between the structural member 20 and the interior member 22. Furthermore, because it is possible to select a location of adhesion to the interior member 22 and an adhesion area from a wide range of choices, and because it is possible to achieve various characteristics by selecting a particular wall thickness or a particular sectional shape of the hollow body 24, the degree of freedom in selecting energy absorbing characteristics is high.

The interior member 22 can easily be attached to the structural member 20. First, the adhesives 60, 61 are applied to required portions of the outward surface 23 of the interior member 22. The hollow body 24 is then adhered to the interior member 22 by the adhesives 60, 61. Alternatively, after the hollow body 24 is placed on a required location on the outward surface 23 of the interior member 22, the adhesives may be applied to adhere the hollow body 24 to the interior member 22. After that, the interior member 22, together with the hollow body 24, can easily be attached to the structural member 20.

If the hollow body 24 is adhered at a plurality of portions thereof to the interior member 22, a sheering force will act on each of the adhered portions so that a reaction force based on the sheering force is produced. Thereby, different energy absorbing characteristics can easily be obtained.

Figure 20:
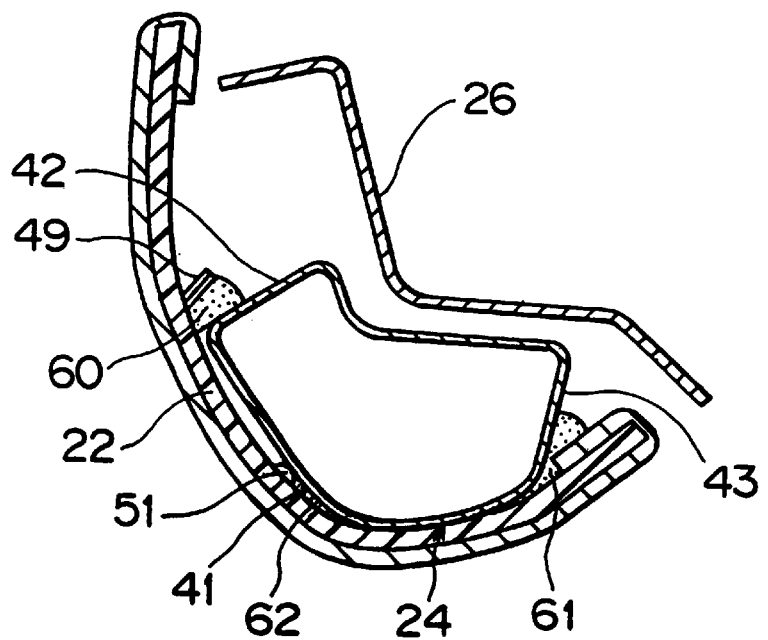
FIG. 20 is a sectional view of a ninth embodiment of the automotive impact energy absorbing structure of the invention, taken on an imaginary plane perpendicular to a lengthwise axis of a structure member.

In a ninth embodiment shown in FIG. 20, a hollow body 24 is adhered to an interior member 22 by an adhesive 60 between a side wall portion 42 of the hollow body 24 and the interior member 22, an adhesive 61 between a side wall portion 43 and the interior member 22 and, further, by an adhesive 62 provided locally between an inward wall portion 41 and the interior member 22. The amount of the adhesive 62 applied can be restricted by a restricting device 51 provided on the interior member 22 in the form of, for example, knurls.

Figure 21:
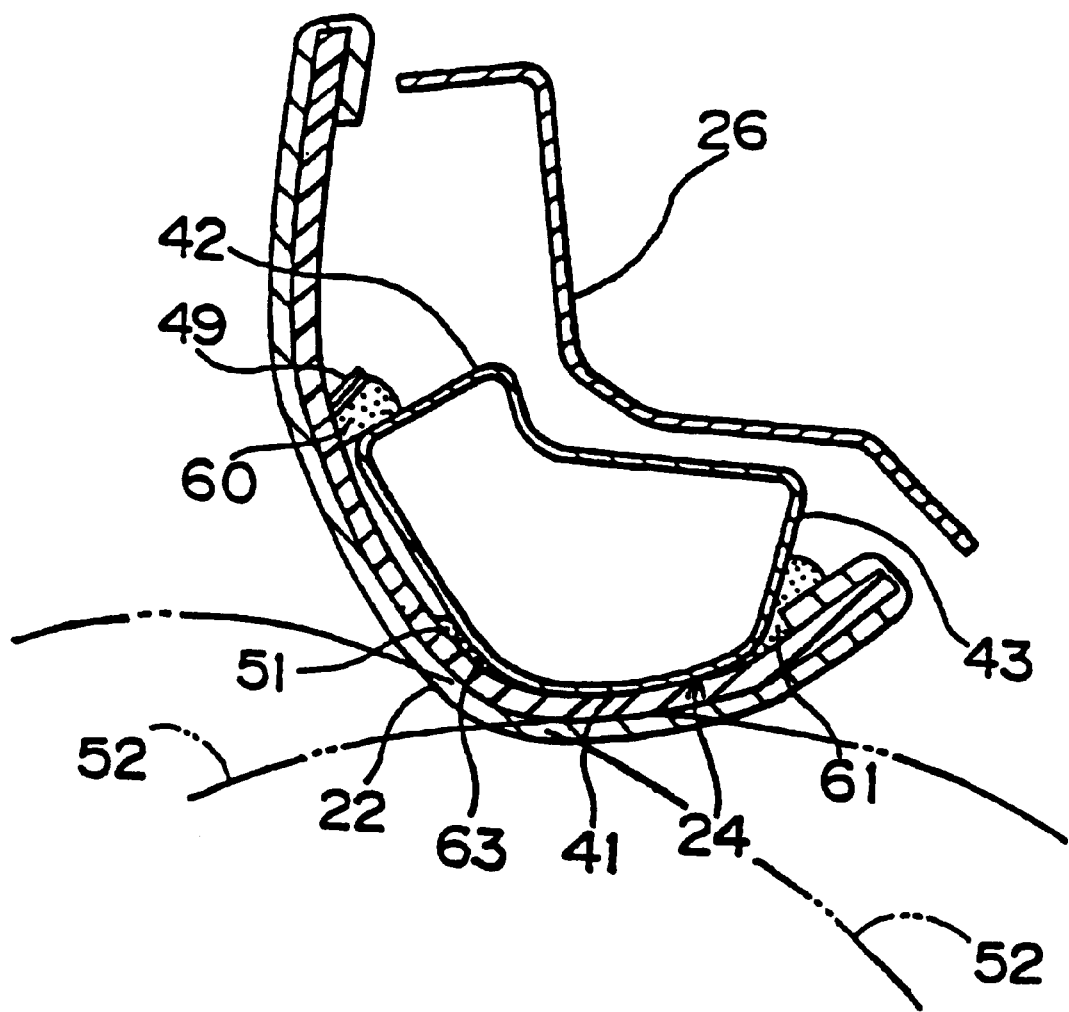
FIG. 21 is a sectional view of a tenth embodiment of the automotive impact energy absorbing structure of the invention, taken on an imaginary plane perpendicular to a lengthwise axis of a structure member.
Figure 22:
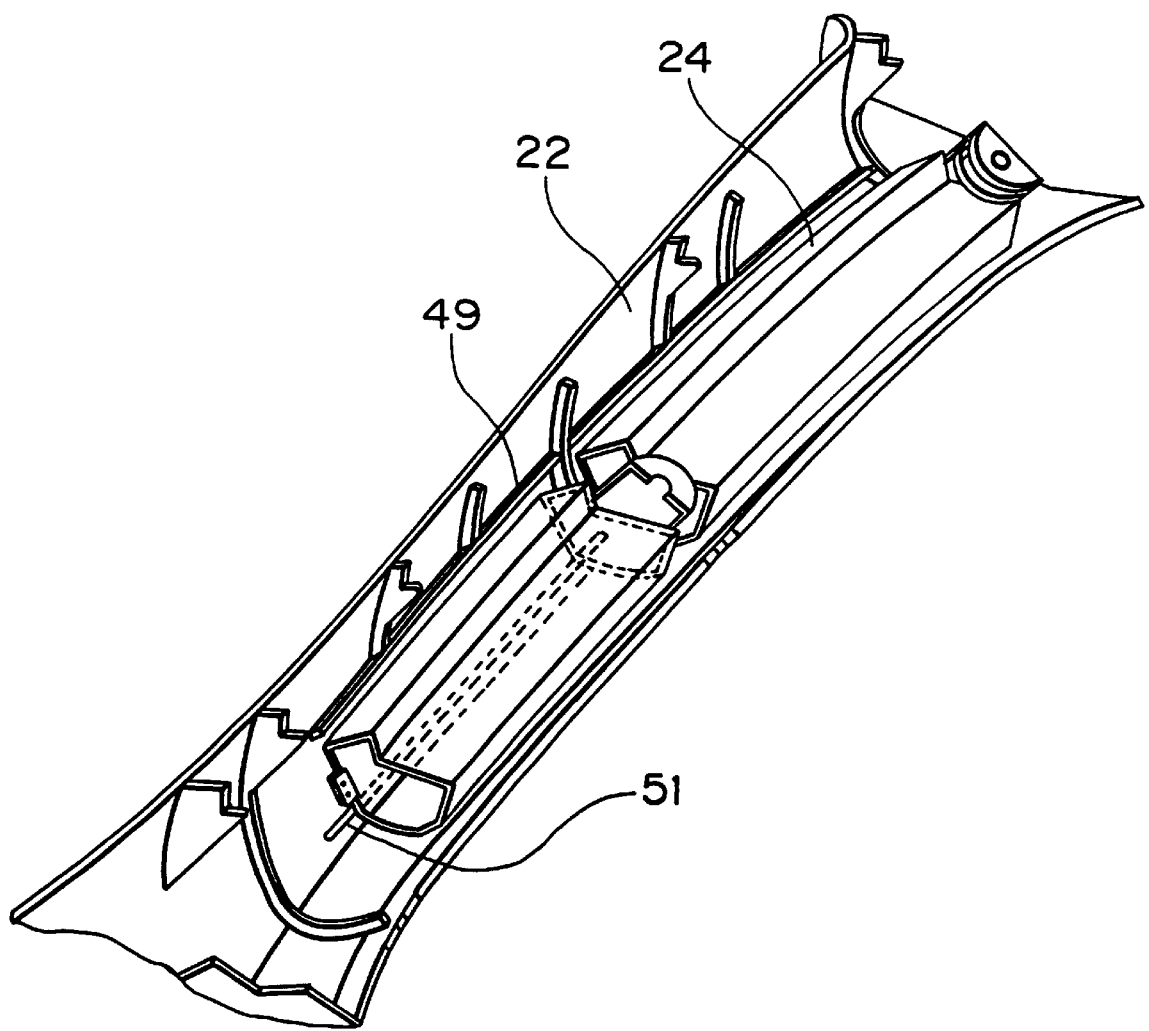
FIG. 22 is a perspective view of an interior member and a hollow body in the eight, ninth and tenth embodiments, viewed from outside a compartment.

In a tenth embodiment as shown in FIG. 21, a hollow body 24 is adhered to an interior member 22 at a surface of the hollow body 24 that receives loads applied to the hollow body 24. The load which is applied to the hollow body 24, the energy of which needs to be absorbed, is from an occupant. A head portion 52 of an occupant may be one of the load sources. Therefore, the hollow body 24 is adhered to the interior member 22, at locations or portions corresponding to the head portion 52 of an occupant. More specifically, as shown in FIG. 21, the hollow body 24 is adhered to the interior member 22 by an adhesive 60 between a side wall portion 42 of the hollow body 24 and the interior member 22, an adhesive 61 between a side wall portion 43 and the interior member 22, and, further, by an adhesive 63 between the interior member 22 and the entire surface of an inward wall portion 41 that substantially corresponds to the head portion 52 of an occupant. The amount of the adhesive 63 applied can be restricted by a restricting device 51 provided on the interior member 22. The adhesives 60, 61 are applied over the length of the hollow body 24 to retain the hollow body 24.

In a case where the hollow body 24 is adhered to the interior member 22 as in the eight, ninth and tenth embodiments, when a load is transmitted to the hollow body 24 by interior member 22, the hollow body 24 starts to be deformed to absorb impact energy and, simultaneously sheering forces act on the adhesives 60, 61, 62, 63 so that the adhesives 60, 61, 62, 63 also absorb impact energy even during an initial period of application of the load. Therefore, energy absorbing characteristics with a sharp rising load can be obtained, and an increased peak value of load can be obtained. Consequently, the displacement required for energy absorption can be reduced. Since a reduction in the displacement required for energy absorption means a reduction of the required size of the interval 36 between interior member 22 and the structural member 20, the space of the compartment can be increased.

In a case wherein the hollow body 24 is adhered, at the two side wall portions 42, 43 to the interior member 22 as in the eighth embodiment, when a load is transmitted to the hollow body 24 by the interior member 22, the inward wall portion 41 of the hollow body 24 first starts to deform. Then, as the side wall portions 42, 43 deform, sheering forces act on the adhesives 60, 61. Therefore, the use of adhesives 60, 61 can achieve energy absorbing characteristics in which the rise of energy absorption is delayed during an initial period and in which a large amount of energy can be absorbed during a later period. Therefore, energy absorption fully utilizing the deformation displacement can be accomplished.

If the interior member 22 is provided with the restricting device 49, it becomes easy to control the energy absorbing characteristics based on appropriate amounts of adhesive by restricting the amount of the adhesive 60 applied or the area of the application.

In a case in which the hollow body 24 is adhered to the interior member 22 at a surface of the hollow body 24 that receives the load applied to the hollow body 24, the thickness of the hollow body 24 can be determined as follows. In FIG. 18, a displacement $S_2$ that the load source 52 is allowed to make for energy absorption if a load from the load source 52 is applied in a direction $f_7$, is greater than a displacement $S_3$ that the load source 52 is allowed to make for energy absorption if the load is applied in a direction $f_6$. Therefore, the wall thickness, shape and the like of the hollow body 24 are determined such that a predetermined impact energy can be absorbed by or within the displacement $S_2$. Although the displacement decreases with respect to the load in the direction $f_6$, such a displacement decrease can be offset by an increase in the reaction load achieved by adhering to the interior member 22 portions of the hollow body 24 that receive load. In the eighth embodiment, the displacement $S_2$ is, for example, about 25 mm while the displacement $S_3$ is, for example, about 17 mm.

Figure 23:
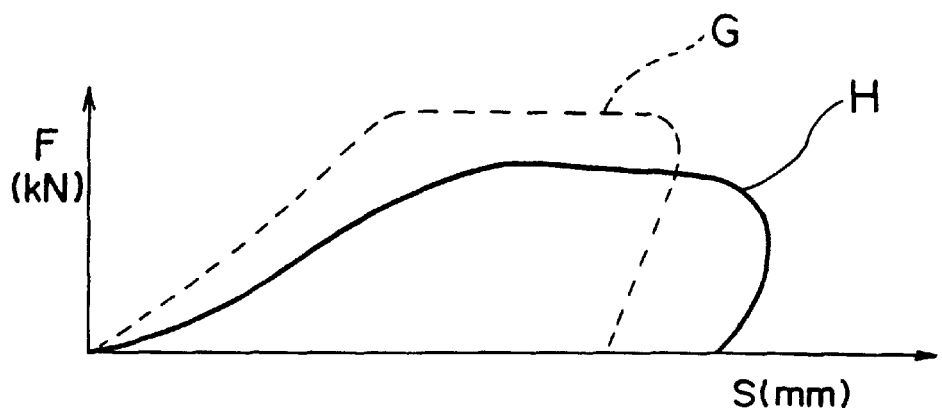
FIG. 23 shows impact energy absorbing characteristic curves indicating the relationship between load and displacement regarding the eight embodiment and a comparative example.

Experiment results will be presented below. FIG. 23 indicates a characteristic curve G in a case where a hollow body as shown in FIGS. 18 and 19 was adhered, at a load-receiving surface thereof, to the interior member, and a characteristic curve H in a case where a hollow body as shown in FIGS. 18 and 19 was fixed or fastened to the inner panel of the structure member. Loads were applied in the direction $f_6$ indicated in FIG. 18 in both cases. The rising of an initial load is greater in the characteristic curve G than in the characteristic curve H. The peak load is also greater in the characteristic curve G. Thus, the reaction load can be qualitatively adjusted by adhering the hollow body to the interior member.

Figure 24:
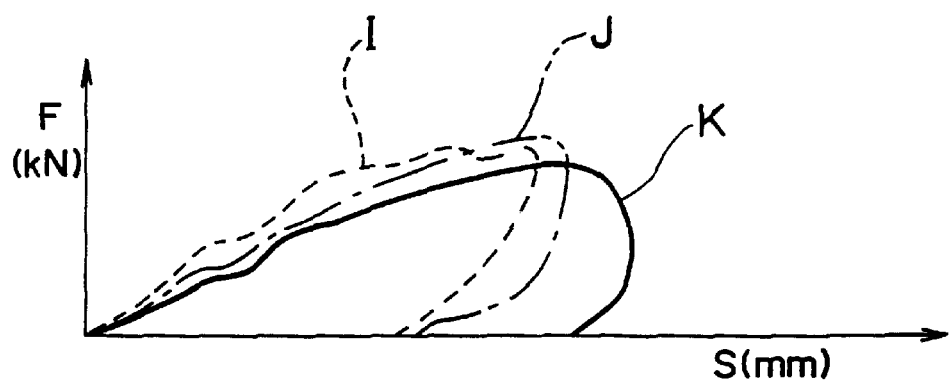
FIG. 24 shows impact energy absorbing characteristic curves indicating the relationship between load and displacement regarding the ninth and tenth embodiments.

FIG. 24 indicates a characteristic curve I in a case (FIG. 21) where a hollow body having a configuration as shown in FIG. 18 was adhered at a load-receiving surface thereof to the interior member, a characteristic curve J in a case (FIG. 20) where an identical hollow body was adhered at three sites in a section thereof to the interior member, and a characteristic curve K in a case (FIGS. 18 and 19) where an identical hollow body was adhered at two sites in a section thereof to the interior member. Loads were applied in the direction $f_6$ indicated in FIG. 18. As can be seen from the curves, the larger the area on the hollow body restricted by adhesive, the greater the rising of an initial load. Thus, the reaction load can be qualitatively adjusted depending on the amount of surface area at which the hollow body is adhered to the interior member.

Figure 25:
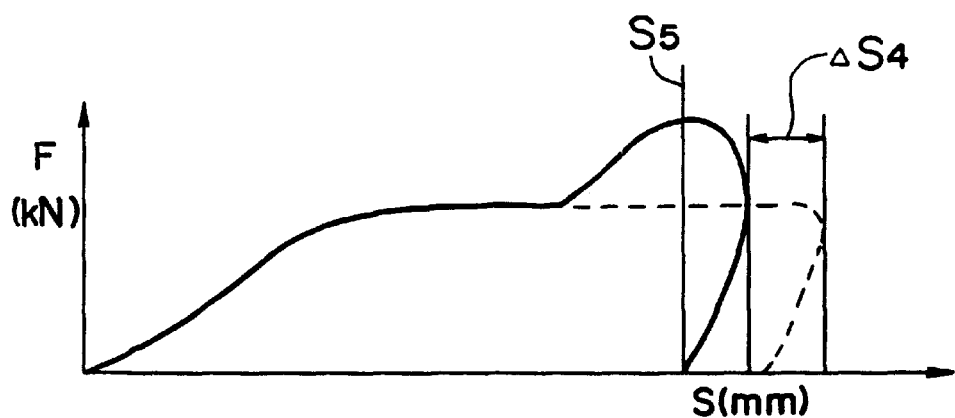
FIG. 25 shows an impact energy absorbing characteristic curve indicating the relationship between load and displacement regarding a modification according to the invention.

FIG. 25 indicates another effect achieved in the case where the hollow body was adhered at its load-receiving surface to the interior member. The initial load increases if the hollow body is adhered to the interior member, as indicated in FIG. 23. This means that if the initial value in the case of the hollow body being adhered only needs to be a value equal to the initial value in the case of the hollow body fastened to the interior member, the wall thickness of the hollow body adhered to the interior member can be reduced. If the wall thickness of the hollow body is not reduced, the entire displacement can be increased while the same initial load condition is maintained by reducing the thickness (overall dimension) of the hollow body itself. For example, while a hollow body undergoes bottom striking after a certain displacement $S_5$, a hollow body having a reduced thickness while retaining the initial load conditions enjoys an entire displacement increased by a displacement $\Delta S_4$, thereby increasing the displacement before bottom striking. In this manner, it is possible to achieve efficient energy absorption while securing the same initial load, by increasing the effective displacement.

Figure 26:
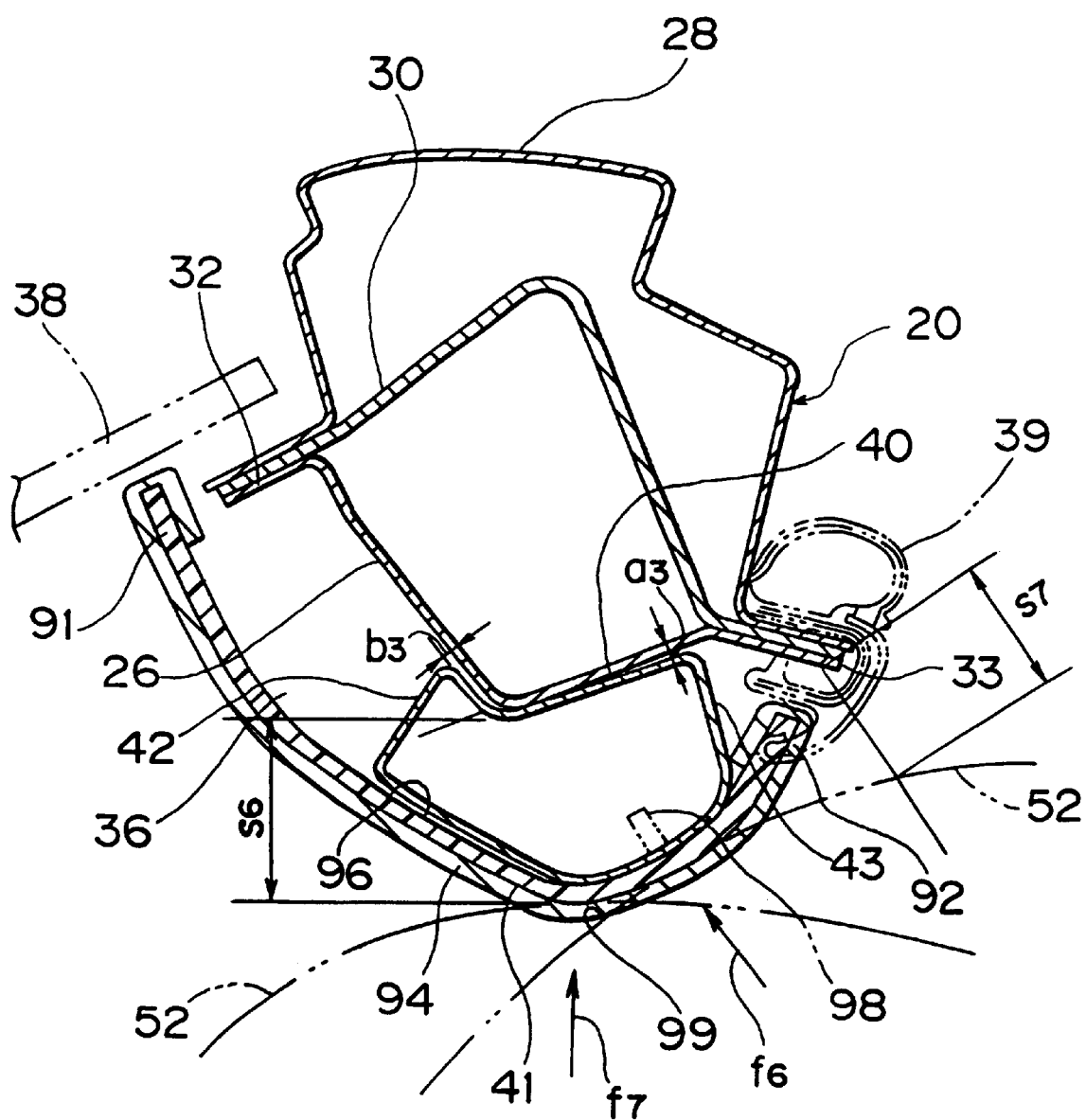
FIG. 26 is a sectional view of an eleventh embodiment of the automotive impact energy absorbing structure of the invention, taken on an imaginary plane perpendicular to a lengthwise axis.
Figure 27:
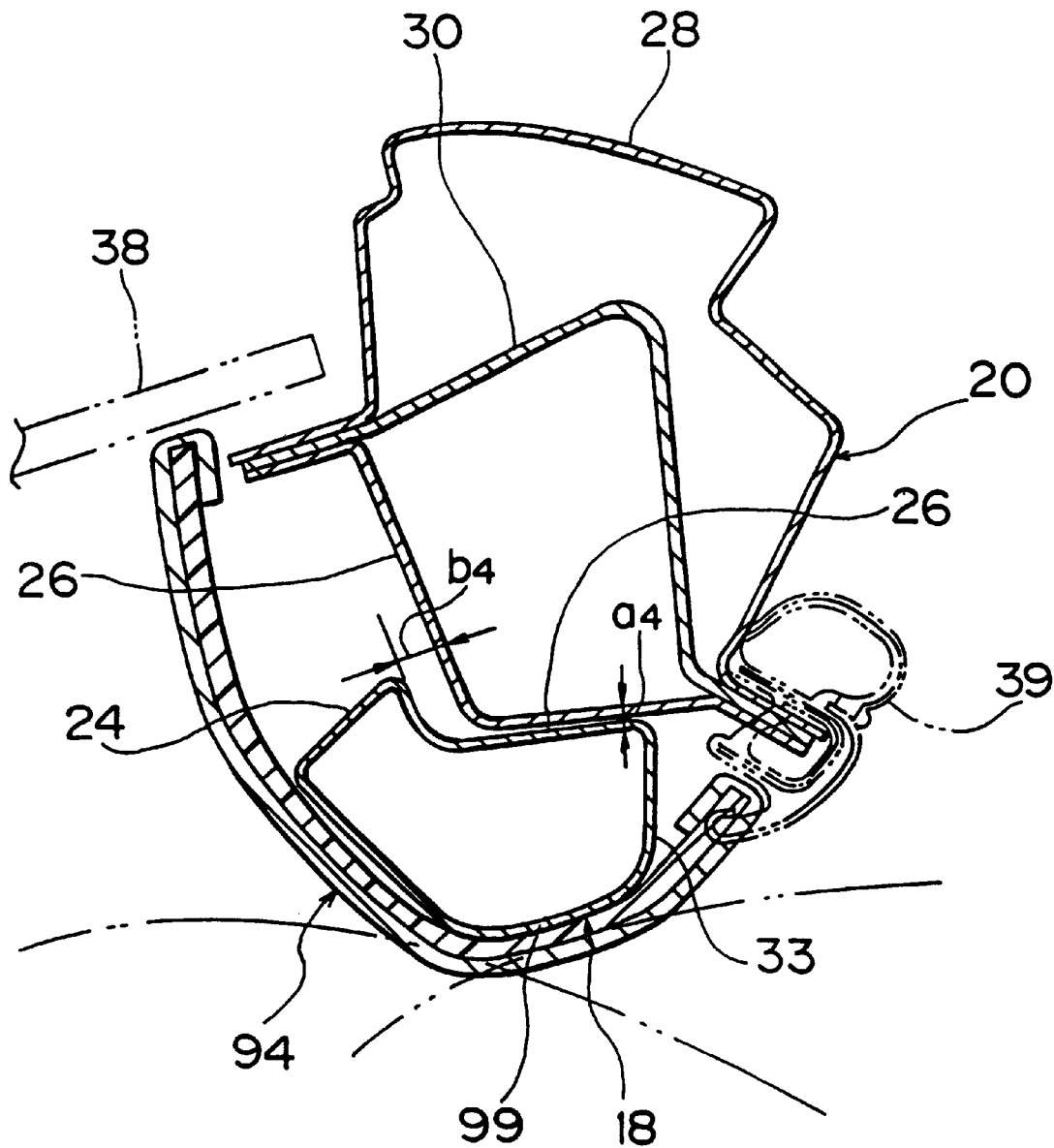
FIG. 27 is another sectional view of the eleventh embodiment, taken on a different imaginary plane perpendicular to a lengthwise axis, the imaginary plane being different from the plane used in FIG. 26.
Figure 28:
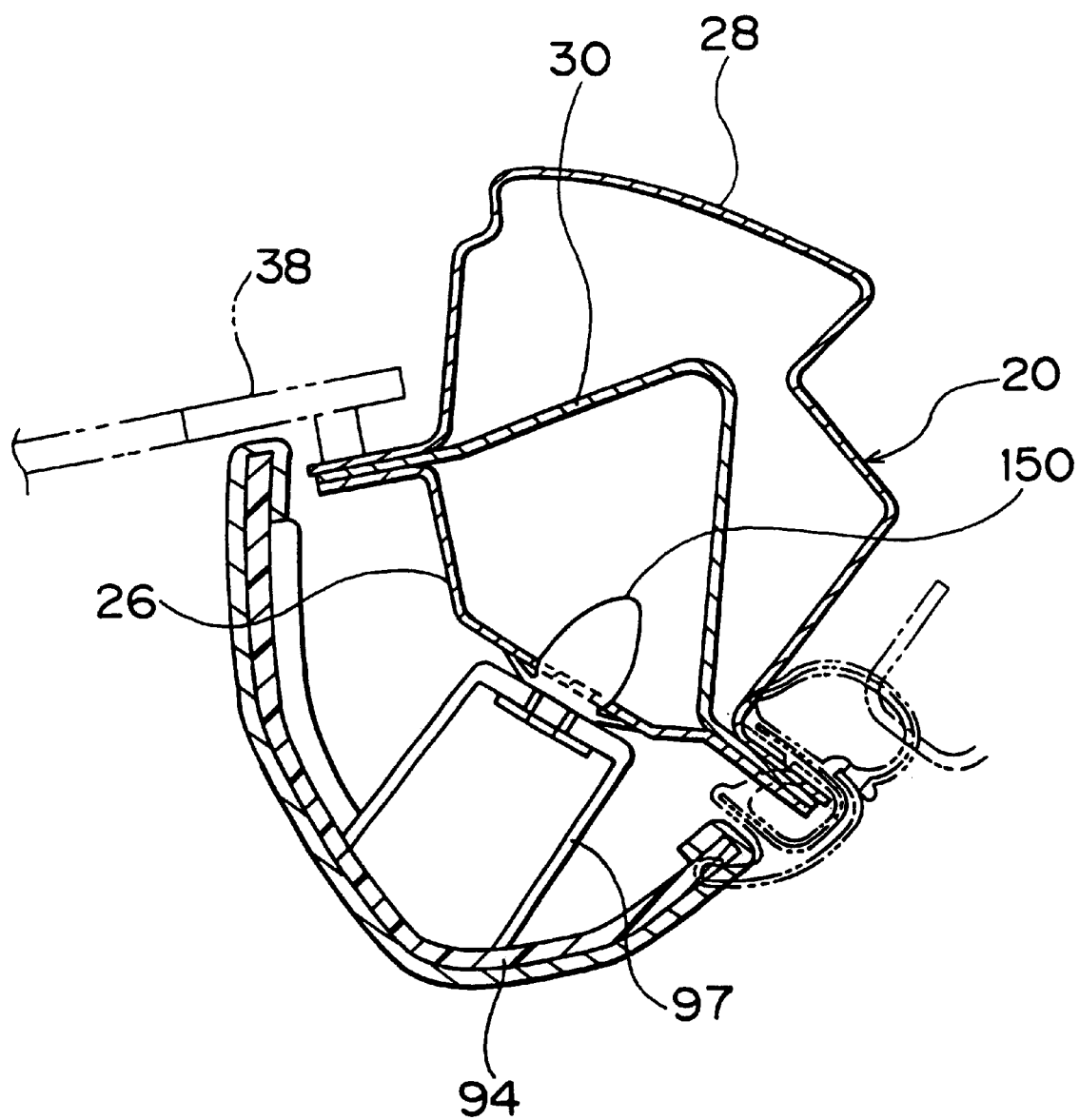
FIG. 28 is still another sectional view of the eleventh embodiment, taken on a different imaginary plane perpendicular to a lengthwise axis, the imaginary plane being different from the planes used in FIGS. 26 and 27.

Referring to the sectional views of FIGS. 26, 27 and 28, an impact energy absorbing structure provided in an upper portion of a vehicle body for absorbing impact energy. The structure includes a structural member 20 having an inner panel 26 and extending in the lengthwise direction, an interior member 94 spaced in a direction to the inside of a compartment from the inner panel 26 by an interval 36 required for energy absorption, and a hollow body 24 disposed in the interval 36.

In an eleventh embodiment as shown in FIG. 26, a structural member 20 is, for example, a front pillar extending in a top-and-bottom direction relative to a vehicle body. In addition to the inner panel 26, the structural member 20 has an outer panel 28 spaced from the inner panel 26 by an interval extending toward the outside of the compartment, and a reinforcing panel 30 disposed between the panels 26 and 20. Flanges of these panels are connected together by welding so as to form a closed structure in a section taken on a plane perpendicular to a lengthwise axis of the structural member 20. The structural member 20 has two flange-connected portions 32, 33. A front windshield pane 38 can be disposed near a flange-connected portion 32. An opening trim 39 can be connected to the other flange-connected portion 33. A hollow body 24 is disposed near the flange-connected portion 33.

In the eleventh embodiment as shown in FIGS. 26-28, the hollow body 24 is, for example, a metallic member formed from aluminum by extrusion forming. The hollow body 24 is formed so as to have an angular sectional shape. The hollow body 24 has an inward wall portion 41 facing an outward surface 96 of the interior member 94, an outward wall portion 40 facing the inner panel 26, and two side wall portions 42, 43 connecting between the inward wall portion 41 and the outward wall portion 40. The outward wall portion 40 of the hollow body 24 is spaced from the inner panel 26 by gaps. The gaps $a_3$, $a_4$, $b_3$, $b_4$ therebetween vary in size in the lengthwise direction relative to the structural member 20. It is preferred that the hollow body 24 is formed so that the thickness of the hollow body 24 locally varies in a section thereof taken on a plane perpendicular to the lengthwise axis. In the eleventh embodiment shown in FIG. 26, the hollow body 24 is formed so that the hollow body 24 is thickest in the inward wall portion 41.

The interior member 94 is, for example, a pillar garnish. The interior member 94 fixes the hollow body 24 by the outward surface 96 of the interior member 94. This fixation can be accomplished, for example, by adhering the inward wall portion 41 of the hollow body 24 to the outward surface 96 of the interior member 94 with an adhesive, or by inserting a plurality of projections 98 protruding from the interior member 94 toward the outside, into corresponding holes (not shown) formed in the hollow body 24, as indicated in FIG. 26, and then thermally riveting the projections 98.

The interior member 94 is formed so that the thickness thereof is not uniform in a section taken on a plane perpendicular to a lengthwise axis of the structural member 20. In the eleventh embodiment as shown in FIG. 26, wherein a direction $f_6$ of a load that is expected to act on the interior member 94 at a site near the flange-connected portion 33 and a direction $f_7$ of a load that is expected to act on the interior member 94 at a site remote from the flange-connected portion 33 are indicated, the interior member 94 is formed so that the thickness of a thin portion 99 corresponding to the load direction $f_7$, not the load direction $f_6$, is smaller than the thicknesses of the other portions.

That is, the interior member 94 gradually becomes thinner from end portions 91, 92 toward the thin portion 99. For example, the thickness of the thin portion 99 may be about 0.5-1.5 mm smaller than that of the end portions 91, 92.

The interior member 94 has two mounting seats 97, as shown in FIG. 28, that are formed in an intermediate portion and an end portion of the interior member 94 in the lengthwise direction. The hollow body 24 is divided into two sections by the mounting seat 97 formed in the intermediate portion. Each of the mounting seats 97 extends to the vicinity of the inner panel 26, and carries a clip 150 attached thereto. The interior member 94 is attached to the structural member 20 by inserting the clips 150 of the mounting seats 97 into holes of the inner panel 26.

The operation of the eleventh embodiment will be described below.

Figure 29:
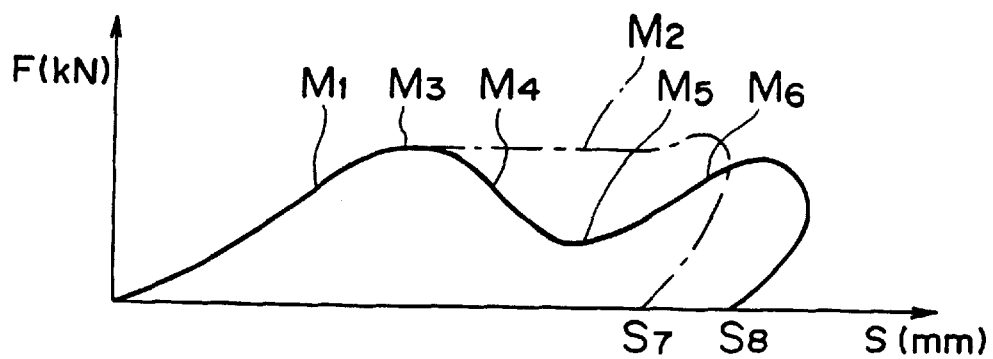
FIG. 29 shows an impact energy absorbing characteristic curve indicating the relationship between load and displacement regarding the eleventh embodiment.

If a load is applied from an occupant 52 in the direction $f_7$ indicated in FIG. 26 such that the interior member 94 deforms in the direction of the load, the hollow body 24 deforms so that an initial load $M_1$ occurs as indicated in FIG. 29. Since the hollow body 24 does not move relative to the inner panel 26 during deformation of the interior member 94 in the direction $f_7$, the force-receiving area of the hollow body 24 remains unchanged. Therefore, the reaction load is maintained as indicated by $M_2$.

According to the invention, since the thickness of the interior member 94 is reduced in the thin portion 99, application of a load in the direction $f_6$ deforms the interior member 94 in such a manner that the interior member 94 falls or bends counterclockwise in FIG. 26, with the thin portion 99 acting as a fulcrum, thereby displacing the hollow body 24 relative to the inner panel 26. Therefore, the deformation of the hollow body 24 provides an initial load $M_1$, but the force-receiving area of the hollow body 24 decreases. Therefore, after a peak load $M_3$ is reached, the reaction load decreases as indicated by $M_4$. When the displacement of the hollow body 24 is stopped, the reaction load becomes a minimum value $M_5$ and then increases again as indicated by $M_6$. Since the hollow body 24 is displaced by deformation of the interior member 94, the displacement becomes $S_8$, which is greater than displacement $S_7$ obtained in a structure where displacement of a hollow body is not intended.

Figure 30:
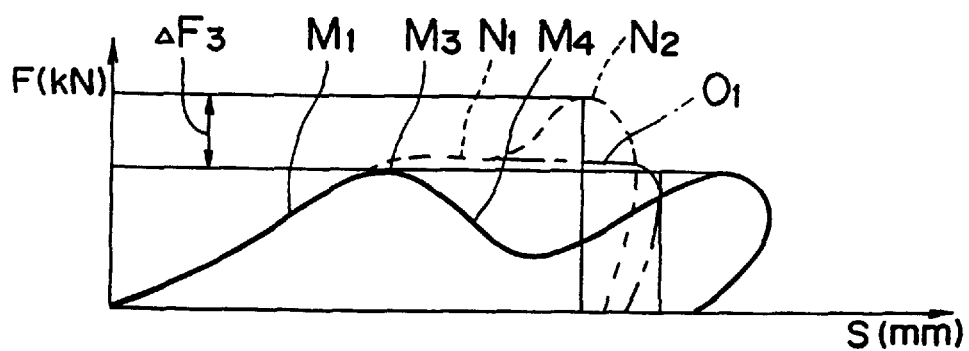
FIG. 30 shows another impact energy absorbing characteristic curve indicating the relationship between load and displacement regarding the eleventh embodiment.

If a load is applied in the direction $f_6$ as indicated in FIG. 26, the interval between the occupant 52 and the flange-connected portion 33 becomes $S_7$. If a load is applied in the direction $f_7$, the interval between the occupant 52 and the inner panel 26 becomes $S_6$. In the structure shown in FIG. 26, $S_6 > S_7$. If the interior member 94 deforms in the load direction $f_6$, the energy absorbing body brings about an initial load $M_1$. In this case, the force-receiving area remains unchanged, so that the reaction load is maintained at $N_1$ as indicated in FIG. 30. Then, at a displacement $S_7$, the interior member 94 contacts the flange-connected portion 33, so that the reaction load rapidly increases to $N_2$. According to the invention, however, a load in the direction $f_6$ causes the interior member 94 to deform in such a manner that the interior member 94 falls or bends in with the thin portion 99 serving as a turning center. The hollow body 24 is thereby deformed. Therefore, the occurring load exhibits a characteristic as indicated by $M_1$, $M_3$, $M_4$, $M_5$ and $M_6$, with a peak load reduced by $\Delta F_3$. On the other hand, if a load is applied in the direction $f_7$, the inward wall portion 41 of the hollow body 24 receives load as the interior member 94 deforms since the thin portion 99 of the interior member 94 is faced by a large thickness portion of the hollow body 24. Load is then transmitted from the inward wall portion 41 to the two side wall portions 42, 43 and the outward wall portion 40 of the hollow body 24. Deformation progresses while the force-receiving area remains unchanged. Thus, the occurring load is maintained as indicated by $O_1$.

Figure 31:
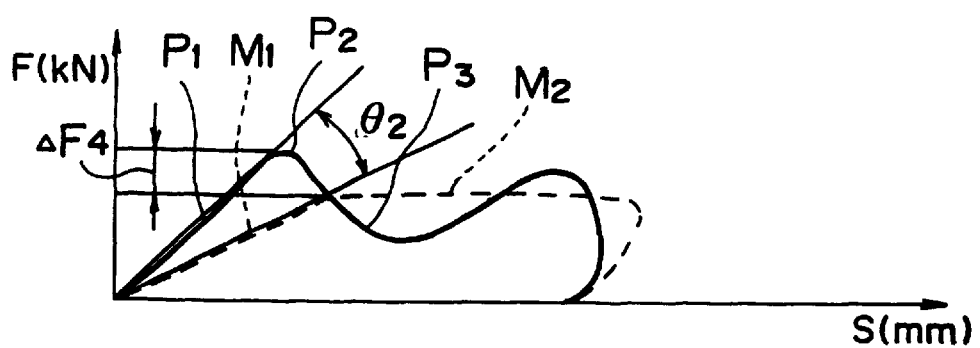
FIG. 31 shows still another impact energy absorbing characteristic curve indicating the relationship between load and displacement regarding the eleventh embodiment.

If the thickness of the inward wall portion 41 of the hollow body 24 is substantially equal to the thickness of the other portions of the hollow body 24, the load provided by the energy absorbing body becomes as indicated by $M_1$ and $M_2$ in FIG. 31 when a load applied in the direction $f_6$ deforms the interior member 94 in a falling or bending manner with the thin portion 99 serving as a fulcrum or turning center. In contrast, in the embodiment as shown in FIG. 1, the thickness of the inward wall portion 41 of the hollow body 24 is greater than the thickness of the other portions thereof, so that the load provided by the energy absorbing body during the falling or bending deformation of the interior member 94 with the thin portion 99 serving as a fulcrum or turning center becomes as indicated by P1, P2, P3 in FIG. 31. Thus, a characteristic is obtained that the rising slope is increased by $\theta_2$ and the peak load is increased by $\Delta F_4$.

As can be understood from the above description, in the eleventh embodiment, when the interior member 94 is deformed by application of a load equal to or greater than a predetermined value, the hollow body 24 fixed to the outward surface 96 of the interior member 94 is displaced together with the interior member 94 in the direction of the load. When the hollow body 24 contacts the inner panel 26 of the structural member 20, the hollow body 24 starts to plastically deform, thereby absorbing energy.

Since the thickness of the interior member 94 locally varies, application of a load to a portion of the interior member 94 that is remote from the thin portion 99 of the interior member 94 causes the interior member 94 to deform with the thin portion 99 serving as a fulcrum or turning center. As the interior member 94 thus deforms, the hollow body 24 is displaced toward the inner panel 26 of the structural member 20. Therefore, a portion of the hollow body 24 that deforms can be forcibly restricted by the interior member 94.

If a load is applied to the thin portion 99 of the interior member 94, the entire interior member 94 is displaced in the direction of the load, deforming the hollow body 24. Therefore, it becomes easy to set an amount of displacement or configuration required for energy absorption regarding the hollow body 24 and a sufficient amount of energy absorption can be secured. There is no need to provide a hollow body with the required energy absorbing characteristics or with deforming characteristics in various load directions. Thus, the shape and structure of the hollow body 24 can be simplified.

Since the hollow body 24 has a great ductility, and starts to plastically deform at an earlier timing relative to an amount of displacement, a sufficient amount of impact energy can be absorbed during an initial period of load application. Furthermore, since the hollow body 24 can be formed by extrusion forming, an energy absorbing body having a required shape can easily be formed.

If a load is applied to a portion remote from the flange-connected portion 33, the entire interior member 94 is deformed in the direction of the load, whereby the hollow body 24 is deformed. Since there is no possibility that during this deformation, the interior member 94 or the hollow body 24 will strike one of the flange-connected portions, that is, the flange-connected portion 33, and receive a reaction force from the flange-connected portion 33, it is possible to secure a long stroke and to increase the area of the hollow body 24 that faces the inner panel 26 of the structural member 20. Therefore, impact energy absorption is performed with low reaction loads and long displacements. On the other hand, if a load is applied to a portion of the interior member 94 which is remote from the thin portion 99 but close to the flange-connected portion 33, the interior member 94 deforms with the thin portion 99 serving like a fulcrum or turning center, thereby displacing the hollow body 24 away from the flange-connected portion 33. The hollow body 24 then contacts the inner panel 26 and deforms, absorbing impact energy. In this case, the displacement is increased by an amount corresponding to the displacement of the hollow body 24 away from the flange-connected portion 33. Therefore, energy absorption is performed with the increased displacement and increased reaction loads.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An automotie impact energy absorbing structure comprising:

a structural member extending in an upper portion of a vehile body such that the structural member defines a lengthwise direction relative to teh vehicle body, the structural member including a first panel;

an interior member spaced from the first panel by an interval extending from the first panel toward an inside of a compartment of the vehicle body, the interior member being formed so that a thickness of the interior member in a section taken on a plane perpendicular to the lengthwise direction varies, wherein the interior member is formed so that two end portions of the interior member in the section are of a substantially constant thickness and a portion of the interior member remote from the end portions is thinner than the end portions; and a hollow body made form metal disposed in the interval and fixed to the interior memeber.

2. The automotive impact energy absorbing structure according to claim 1, wherein the structural member further includes two flange-connected portions whereby the first panel and a second panel spaced from the first panel are connected, the hollow body is disposed near one flange-connected portion of the two flange-connected portions, and the interior member is formed so that a portion of the interior member remote from the one flange-connected portion is thinner than other portions of the interior member.

3. The automotive impact energy absorbing structure according to claim 1, wherein the hollow body is adhered to the interior member by an adhesive.

4. The automotive impact energy absorbing structure according to claim 1, wherein portions of the interior member remote from the end portions become thinner from the end portions of the interior memeber.

5. The automotive impact energy absorbing structure according to claim 1, wherein the hollow body defines an axis and has an angular section shape in a section taken on a plane perpendicular to the axix, the angular sectinal shape being formed by an outward wall portion extending substantially along an inward side wall of the first panel, an inward wall portion extending substantially along an outward side surface of the interior member, a first side wall portion and a second side wall portion, the first side wall portion and the second side wall portion connecting the outward wall portion to the inward wall portion.

6. The automotive impact energy absorbing structure according to claim 5, wherein the hollow body is fixed to the interior member, and wherein the outward wall portion of the hollow body has a contact portion that contacts the first panel and a non-contact portion spaced from the first panel.

* * * * *